(12) United States Patent
Qin et al.

(10) Patent No.: US 8,719,194 B2
(45) Date of Patent: May 6, 2014

(54) HYBRID INTERIOR-POINT ALTERNATING DIRECTIONS ALGORITHM FOR SUPPORT VECTOR MACHINES AND FEATURE SELECTION

(75) Inventors: Zhiwei Qin, New York, NY (US); Xiaocheng Tang, Plainsboro, NJ (US); Ioannis Akrotirianakis, Plainsboro, NJ (US); Amit Chakraborty, East Windsor, NJ (US)

(73) Assignee: Siemens Aktiengesellschaft, München (DE)

( * ) Notice: Subject to any disclaimer, the term of this patent is extended or adjusted under 35 U.S.C. 154(b) by 107 days.

(21) Appl. No.: 13/611,528

(22) Filed: Sep. 12, 2012

(65) Prior Publication Data

US 2013/0073489 A1  Mar. 21, 2013

Related U.S. Application Data

(60) Provisional application No. 61/536,092, filed on Sep. 19, 2011.

(51) Int. Cl.
*G06N 99/00* (2010.01)

(52) U.S. Cl.
USPC .............................................. 706/12; 706/45

(58) Field of Classification Search
CPC .............................. G06N 99/00; G06N 99/005
USPC .................................................... 706/12, 45
See application file for complete search history.

(56) References Cited

PUBLICATIONS

Forero, et al., Consensus-Based Distributed Support Vector Machines, Journal of Machine Learning Research, 11, 2010, pp. 1663-1707.*
Hui Zou, et al., "Regularization and Variable Selection Via the Elastic Net," J.R. Statistic Society B (2005) 67, Part 2, pp. 301-320.

(Continued)

*Primary Examiner* — Wilbert L Starks
(74) *Attorney, Agent, or Firm* — Michele L. Conover

(57) ABSTRACT

A method for training a classifier for selecting features in sparse data sets with high feature dimensionality includes providing a set of data items x and labels y, minimizing a functional of the data items x and associated labels y $L(w, b, a, c, \gamma_1, \gamma_2) :=$ $$\frac{1}{N}\sum_{i=1}^{N} a_i + \lambda_1 \|c\|_1 + \frac{\lambda_2}{2}\|w\|_2^2 + \gamma_1^T(e - Y(Xw + be) - a) +$$

$$\gamma_2^T(w - c) + \frac{\mu_1}{2}\|e - Y(Xw + be) - a\|_2^2 + \frac{\mu_2}{2}\|w - c\|_2^2$$

to solve for hyperplane w and offset b of a classifier by successively iteratively approximating w and b, auxiliary variables a and c, and multiplier vectors $\gamma_1$ and $\gamma_2$, wherein $\lambda_1$, $\lambda_2$, $\mu_1$, and $\mu_2$ are predetermined constants, e is a unit vector, and X and Y are respective matrix representations of the data items x and labels y; providing non-zero elements of the hyperplane vector w and corresponding components of X and Y as arguments to an interior point method solver to solve for hyperplane vector w and offset b, wherein w and b define a classifier than can associate each data item x with the correct label y.

19 Claims, 11 Drawing Sheets

(56) References Cited

PUBLICATIONS

Rong-En Fan, et al., "Working Set Selection Using Second Order Information for Training Support Vector Machines," Journal of Machine Learning Research 6 (2005), pp. 1889-1918.

Li Wang, et a., "The Doubly Regularized Support Vector Machine," Statistica Sinica 16 (2005), p. 589-615.

Jonathan Eckstein, et al., "On the Douglas-Rachford Splitting Method and the Proximal Point Algorithm for Maximal Monotone Operators," Oct. 1989, pp. 1-34.

E. Michael Gertz, et al., "Object-Oriented Software of Quadratic Programming," ACM Transaction on Mathematical Software, vol. 29, No. 1, Mar. 2003, pp. 58-81.

Glenn Fung, et al., "Knowledge-Based Support Vector Machine Classifiers,".

Jianing Shi, et al., "A Fast Hybrid Algorithm for Large-Scale $\ell$1-Regularized Logistic Regression," Journal of Machine Learning Research 11 (2010), pp. 713-741.

Gui-Bo Ye, et al., "Efficient Variable Selection in Support Vector Machines Via the Alternating Direction Method of Multipliers," Proceedings of the 14th International Conference on Artificial Intelligence and Statistics (AISTATS), 2011, vol. 15, pp. 832-840.

Stephen Boyd, et al., "Distributed Optimization and Statistical Learning Via the Alternating Direction Method of Multipliers," Foundations and Trends in Machine Learning, vol. 3, No. 1, (2010) pp. 1-122.

David D. Lewis, et al., "RCV1: A New Benchmark Collection for Text Catergorization Research," Journal of Machine Learning Research 5 (2004), pp. 361-397.

\* cited by examiner

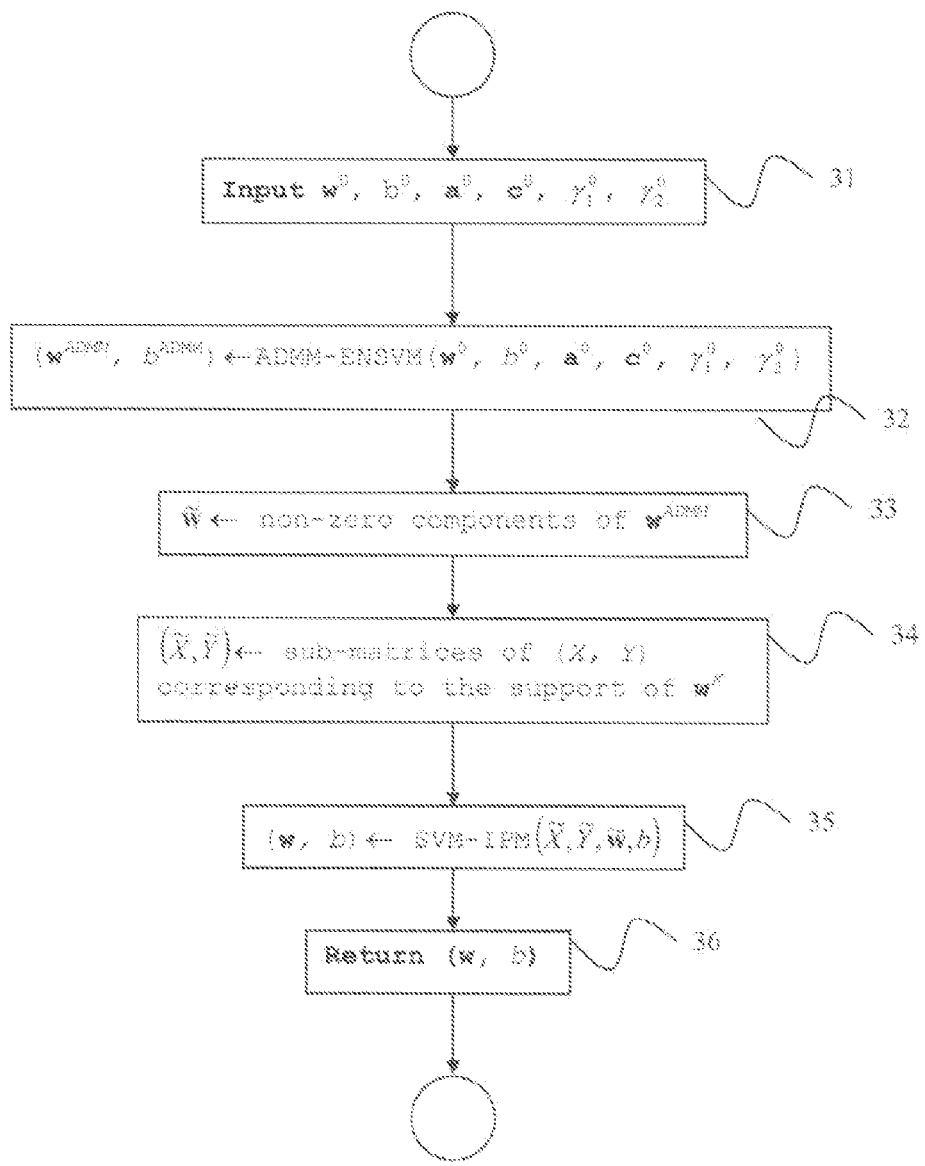

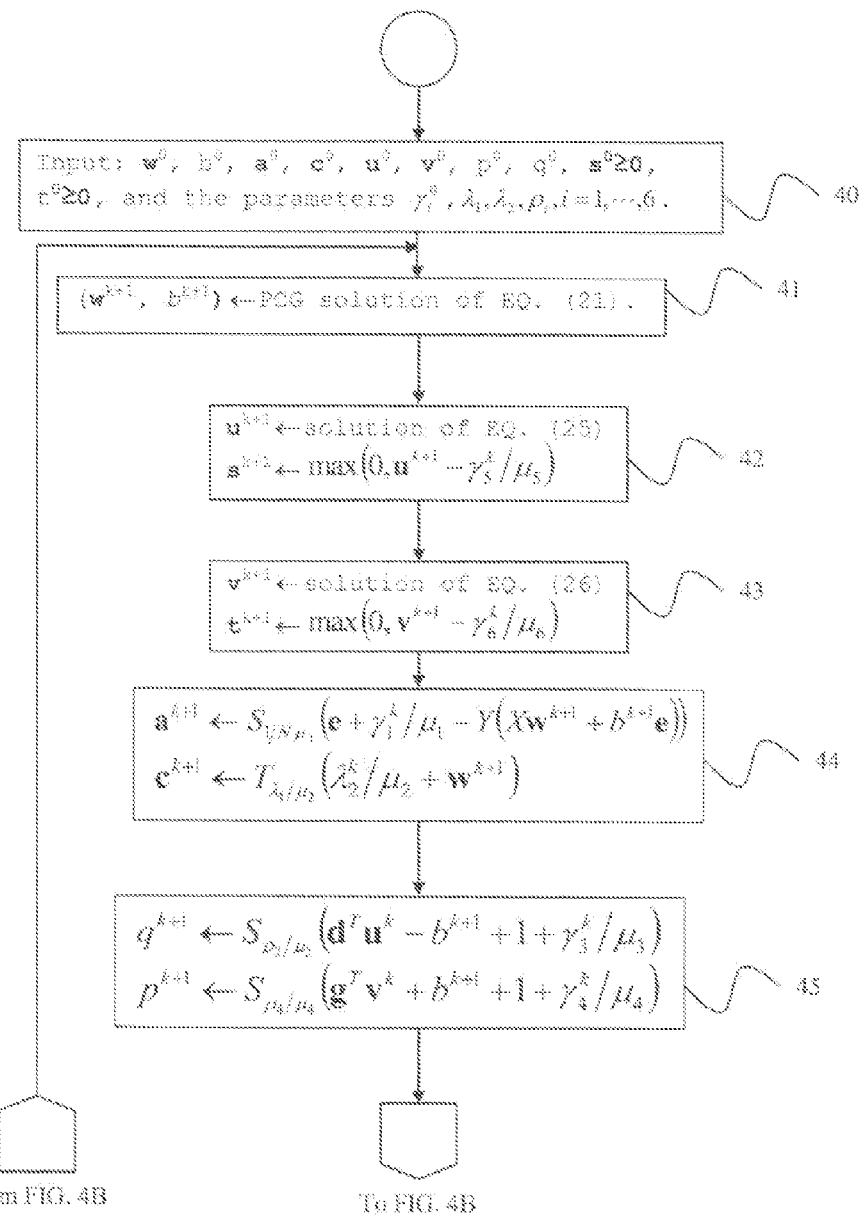

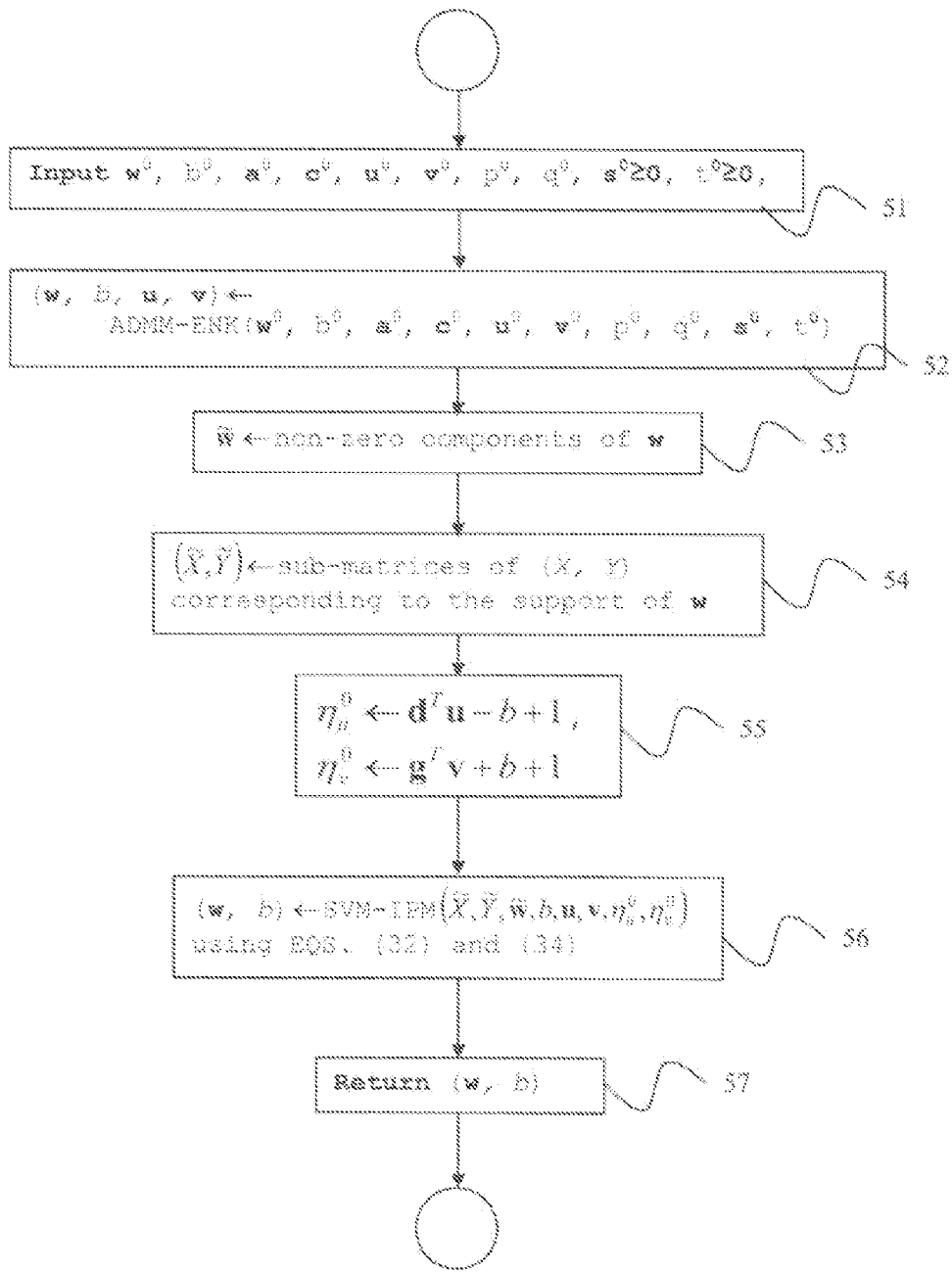

| Data set | $N_1$ | $N_2$ | No. real features | $\lambda_1$ |
|---|---|---|---|---|
| australian | 500 | 190 | 14 (10,000) | 0.2 |
| wine | 60 | 70 | 13 (10,000) | 0.15 |
| diabetes | 600 | 168 | 8 (10,000) | 0.03 |
| leukemia | 38 | 34 | 7,129 (20,000) | 0.5 |

Table 1

Table 2

| Data set | HIPAD | | | ADMM-ENSVM | | | LIBSVM accuracy (%) | Original accuracy (%) |
|---|---|---|---|---|---|---|---|---|
| | Accuracy (%) | Support size | CPU (s) | Accuracy (%) | Support size | CPU (s) | | |
| australian | 85.8 | 3/3 | 1.04 | 85.8 | 3/3 | 3.03 | 56.8 | 85.8 |
| wine | 98.6 | 9/9 | 9.77 | 98.6 | 7/7 | 31.25 | 82.9 | 98.6 |
| diabetes | 78.0 | 4/4 | 31.42 | 64.3 | 4/4 | 169.87 | 66.7 | 78.0 |
| leukemia | 97.1 | 41/49 | 8.48 | 91.2 | 38/45 | 45.77 | 70.6 | 82.4 |

FIGURE 8

Table 3

| Data set | $N_1$ | $N_2$ | No. features | Type |
|---|---|---|---|---|
| rcv1 | 500 | 1,000 | 47,236 | Sparse |
| real-sim | 500 | 1,000 | 20,958 | Sparse |
| gisette | 500 | 1,000 | 5,000 | Dense |
| duke | 32 | 10 | 7,129 | Dense |
| leukemia | 38 | 34 | 7,129 | Dense |
| colon-cancer | 30 | 32 | 2,000 | Dense |
| fMRIa | 30 | 10 | 1,715 | Dense |
| fMRIb | 30 | 10 | 1,874 | Dense |
| fMRIc | 30 | 10 | 1,888 | Dense |

FIGURE 9

Table 4

| Data set | HIPAD | | | ADMM-ENSVM | | | LIBSVM |
|---|---|---|---|---|---|---|---|
| | Accuracy (%) | Support size | CPU (s) | Accuracy (%) | Support size | CPU (s) | accuracy (%) |
| rcv1 | 86.9 | 2,037 | 1.18 | 86.8 | 7,002 | 1.10 | 86.1 |
| real-sim | 94.0 | 2,334 | 0.79 | 93.9 | 2,307 | 0.31 | 93.4 |
| gisette | 94.7 | 498 | 8.96 | 63.1 | 493 | 45.87 | 93.4 |
| duke | 90 | 168 | 1.56 | 90 | 150 | 5.52 | 80 |
| leukemia | 85.3 | 393 | 1.70 | 82.4 | 717 | 6.35 | 82.4 |
| colon-cancer | 84.4 | 195 | 0.45 | 84.4 | 195 | 1.34 | 84.4 |
| fMRIa | 90 | 157 | 0.25 | 90 | 137 | 2.17 | 60 |
| fMRIb | 90 | 45 | 0.23 | 90 | 680 | 0.75 | 90 |
| fMRIc | 90 | 321 | 0.14 | 90 | 659 | 1.58 | 90 |

FIGURE 10

Table 5

| Data set | HIPAD-ENK | | | ADMM-ENKSVM | | | LIBSVM |
|---|---|---|---|---|---|---|---|
| | Accuracy (%) | Support size | CPU (s) | Accuracy (%) | Support size | CPU (s) | accuracy (%) |
| ksvm-s-10k | 99 | 200 | 1.99 | 97.25 | 200 | 3.43 | 86.1 |
| ksvm-s-50k | 98.8 | 200 | 8.37 | 96.4 | 198 | 20.89 | 74.8 |

FIGURE 11

HYBRID INTERIOR-POINT ALTERNATING DIRECTIONS ALGORITHM FOR SUPPORT VECTOR MACHINES AND FEATURE SELECTION

CROSS REFERENCE TO RELATED UNITED STATES APPLICATIONS

This application claims priority from "HIPAD—A fast Hybrid Interior-Point Alternating Directions algorithm for SVM and feature selection", U.S. Provisional Application No. 61/536,092 of Qin, et al., filed Sep. 19, 2011, the contents of which are herein incorporated by reference in their entirety.

TECHNICAL FIELD

This disclosure is directed to methods for classifying data sets with large feature dimensions in machine learning applications.

DISCUSSION OF THE RELATED ART

Classification tasks on data sets with large feature dimensions are very common in real-world machine learning applications. Typical examples are microarray data for gene selection and text documents for topic classification. Despite the large number of features present in these data sets, usually only small subsets of the features are relevant for the particular learning task, and local correlations among the features are often observed. Hence, feature selection is required for good model interpretability. However, when data is scarce, it is crucial that little prediction accuracy be lost due to errors incurred during optimization during training. Data scarcity is common for biomedical applications, e.g. fMRI data and gene expression data for specific tumors. Another typical case is training classifiers at low levels of a class hierarchy in a hierarchical classification setting, where the training set is small because the labels are very specific. In addition, whenever prior domain knowledge is available, it should be used as much as possible to improve prediction accuracy.

The above considerations suggest three desired features for a learning algorithm: (1) The algorithm should be able to automatically select features/variables which are possibly grouped and highly correlated. (2) The algorithm should be able to efficiently optimize in the training phase with high accuracy. (3) The learning model needs to be flexible enough so that domain knowledge can be easily incorporated. Existing methods are known that individually satisfy the above requirements individually. To handle local correlation among groups of features, the elastic-net regularization has been successfully applied to support vector machines (ENSVM), however, incorporating extra domain knowledge is challenging. An alternating direction method of multipliers (ADMM) has been proposed for the elastic-net SVM which can quickly find an approximate solution to the ENSVM, but ADMM is known to be slow to reach high accuracy. The interior-point methods (IPM) for SVM are known to be able to achieve high accuracy in their solutions with a polynomial iteration complexity, and the dual SVM formulation is independent of the feature space dimensionality. However, because of the need to solve a Newton system in each iteration, the efficiency of IPM quickly deteriorates with increasing feature dimension size.

SUMMARY

Exemplary embodiments of the invention as described herein generally are directed to classification tasks in the regime of scarce labeled training data in high dimensional feature space, where specific expert knowledge is also available. A hybrid learning algorithm according to an embodiment of the invention solves an elastic-net support vector machine (ENSVM) through an alternating direction method of multipliers (ADMM) in a first phase, followed by an interior-point method (IPM) for a standard SVM in a second phase. An algorithm according to an embodiment of the invention addresses the challenges of automatic feature selection, high optimization accuracy, and algorithmic flexibility for knowledge incorporation. Embodiments of the invention have been compared with existing methods on a collection of synthetic and real-world data.

According to an aspect of the invention, there is provided a method for training a classifier for selecting features in sparse data sets with high feature dimensionality, including providing a set of N data items x and associated labels y, each data item being a vector in $R^m$ where $m \gg 1$, minimizing a functional of the data items x and associated labels y $$L(w, b, a, c, \gamma_1, \gamma_2) := \frac{1}{N}\sum_{i=1}^{N} a_i + \lambda_1 \|c\|_1 + \frac{\lambda_2}{2}\|w\|_2^2 + \gamma_1^T(e - Y(Xw + be) - a) + \gamma_2^T(w - c) + \frac{\mu_1}{2}\|e - Y(Xw + be) - a\|_2^2 + \frac{\mu_2}{2}\|w - c\|_2^2$$

formed from a program $$\min_{w,b,a,c} \frac{1}{N}\sum_{i=1}^{N} a_i + \lambda_1 \|c\|_1 + \frac{\lambda_2}{2}\|w\|_2^2$$

subject to $$\begin{cases} a = e - Y(Xw + be), \\ c = w. \end{cases}$$

to solve for hyperplane w and offset b of a classifier using an alternating direction method of multipliers that successively iteratively approximates w and b, auxiliary variables a and c, and multiplier vectors $\gamma_1$ and $\gamma_2$, wherein $\lambda_1, \lambda_2, \mu_1,$ and $\mu_2$ are predetermined constants, e is a unit vector, and X and Y are respective matrix representations of the data items x and their associated labels y, and providing non-zero elements of the hyperplane vector w and those components of X and Y that correspond to the non-zero elements of the hyperplane vector w as arguments to a convex quadratic program solver that uses an interior point method to solve for hyperplane vector w and offset b, wherein the hyperplane vector w and offset b define a classifier than can associate each data item x with the correct label y.

According to a further aspect of the invention, the alternating direction method of multipliers includes, at each iteration k, updating $(w^k, b^k)$ by solving $$\begin{pmatrix} (\lambda_2 + \mu_2)I + \mu_1 X^T X & \mu_1 X^T e \\ \mu_1 e^T & \mu_1 N \end{pmatrix} \begin{pmatrix} w^{k+1} \\ b^{k+1} \end{pmatrix} =$$

-continued
$$\begin{pmatrix} X^TY\gamma_1^k - \mu_1 X^TY(a^k-e) - \gamma_2^k + \mu_2 c^k \\ e^TY\gamma_1^k - \mu_1 e^TY(a_k-e) \end{pmatrix},$$

updating a from $$a^{k+1} \leftarrow S_{1/N\mu_1}\left(e + \frac{\gamma_1^k}{\mu_1} - Y(Xw^{k+1}+b^{k+1}e)\right),$$

wherein $$S_\lambda(\omega) = \begin{cases} \omega - \lambda, & \omega > \lambda, \\ 0, & 0 \le \omega \le \lambda, \\ \omega, & \omega < 0; \end{cases}$$

updating c from $$c^{k+1} \leftarrow T_{\lambda_1/\mu_2}\left(\frac{\gamma_2^k}{\mu_2} + w^{k+1}\right)$$

wherein $T_\lambda(\omega)=\text{sgn}(\omega)\max\{0,|\omega|-\lambda\}$, updating $\gamma_1$ from $\gamma_1^{k+1} \leftarrow \gamma_1^k + \mu_1(e-Y(Xw^{k+1}+b^{k+1}e)-a^{k+1})$, and updating $\gamma 2$ from $\gamma_2^{k+1} \leftarrow \gamma_2^k + \mu_2(w^{k+1}-c^{k+1})$, where said updates are repeated until $$\frac{\|w^{k+1}-w^k\|}{\max(\|w^k\|,1)} < \varepsilon_{tol},$$

wherein $\varepsilon_{tol}$ is a predetermined constant.

According to a further aspect of the invention, the linear system $$\begin{pmatrix} (\lambda_2+\mu_2)I + \mu_1 X^TX & \mu_1 X^T e \\ \mu_1 e^T & \mu_1 N \end{pmatrix}\begin{pmatrix} w^{k+1} \\ b^{k+1} \end{pmatrix} = \\ \begin{pmatrix} X^TY\gamma_1^k - \mu_1 X^TY(a^k-e) - \gamma_2^k + \mu_2 c^k \\ e^TY\gamma_1^k - \mu_1 e^TY(a_k-e) \end{pmatrix}$$

is solved using a preconditioned conjugate gradient method.

According to a further aspect of the invention, the convex quadratic program solver minimizes a quadratic program $\frac{1}{2}w^Tw + ce^T\xi$ with respect to w, b, s, and $\xi$ subject to $$\begin{cases} y_i(w^Tx_i - b) - s_i + \xi_i = 1, & i=1,\cdots,N, \\ s \ge 0, \xi \ge 0, \end{cases}$$

wherein c is a predetermined penalty parameter for $\xi$, and $y_i$ and $x_i$ are components of $\overline{X}$, $\overline{Y}$ corresponding to non-zero elements of w.

According to a further aspect of the invention, the convex quadratic program solver minimizes a quadratic program $\frac{1}{2}\alpha^TQ\alpha - e^T\alpha$ that is a dual of $\frac{1}{2}w^Tw+ce^T\xi$, wherein $\frac{1}{2}\alpha^TQ\alpha-e^T\alpha$ is minimized with respect to $\alpha$ subject to $$\begin{cases} y^T\alpha = 0, \\ 0 \le \alpha_i \le c, \quad i=1,\ldots,N, \end{cases}$$

and c is a predetermined penalty parameter for $\xi$.

According to another aspect of the invention, there is provided a method for training a classifier for selecting features in sparse data sets with high feature dimensionality that incorporates prior domain knowledge, including providing a set of data items x and associated labels y, each data item being a vector in $R^m$ where m>>1, a set of positive class constraints $Bx \le d \Rightarrow w^Tx+b \ge 1$, wherein $B \in R^{k_1 \times m}$ and $d \in R^{k_1}$, and a set of negative class constraints $Dx \le g \Rightarrow w^Tx+b \le -1$, wherein $D \in R^{k_2 \times m}$ and $g \in R^{k_2}$, using Farkas lemma to transform the positive class constraints into $B^Tu+w=0$, $d^Tu-b+1 \le 0$, $u \ge 0$ and negative class constraints into $D^Tv-w=0$, $g^Tv+b+1 \le 0$, $v \ge 0$, minimizing a functional $$L = \frac{\lambda_2}{2}\|w\|_2^2 + \lambda_1\|c\|_1 + \frac{1}{N}eT(a)_+ + \frac{\rho_1}{2}\|B^Tu+w\|_2^2 + \\ \rho_2(q)_+ + \frac{\rho_3}{2}\|D^Tv-w\|_2^2 + \rho_4(p)_+ + \gamma_1^T(e-(\overline{X}w+yb)-a) + \\ \frac{\mu_1}{2}\|e-(\overline{X}+yb)-a\|_2^2 + \gamma_2^T(w-c) + \frac{\mu_2}{2}\|w-c\|_2^2 + \\ \gamma_3(d^Tu-b+1-q) + \frac{\mu_3}{2}\|d^Tu-b+1-q\|_2^2 + \\ \gamma_4(g^Tv+b+1-p) + \frac{\mu_4}{2}\|g^Tv+b+1-p\|_2^2$$

to solve for hyperplane w and offset b of a classifier using an alternating direction method of multipliers that successively iteratively approximates w and b, constraint variables u and v, auxiliary variables a, c, p and q, and Lagrangian multipliers $\gamma_1^{k+1}$, $\gamma_2^{k+1}$, $\gamma_3^{k+1}$, $\gamma_4^{k+1}$, $\gamma_5^{k+1}$, and $\gamma_6^{k+1}$ wherein $\lambda_1$, $\lambda_2$, $\rho_1$, $\rho_2$, $\rho_3$, $\rho_4$, $\mu_1$, $\mu_2$, $\mu_3$, and $\mu_4$ are predetermined constants, e is a unit vector, and X and Y are respective matrix representations of the data items x and their associated labels y, and providing non-zero elements of the hyperplane vector w, those components of X and Y that correspond to the non-zero elements of the hyperplane vector w, and $\eta_u^0 \equiv d^Tu-b+1$, $\eta_v^0 \equiv g^Tv+b+1$ as arguments to a convex quadratic program solver that uses an interior point method to solve for hyperplane vector w and offset b, wherein the hyperplane vector w and offset b define a classifier than can associate each data item x with the correct label y.

According to a further aspect of the invention, updating $(w^k, b^k)$ comprises solving $$\begin{pmatrix} \kappa_1 I + \mu_1 X^TX & \mu_1 X^T e \\ \mu_1 e^T X & \mu_1 N + \kappa_2 \end{pmatrix}\begin{pmatrix} w^{k+1} \\ b^{k+1} \end{pmatrix} = \begin{pmatrix} r_w \\ r_b \end{pmatrix}$$

where $\kappa_1 = \lambda_2 + \mu_2 + \rho_1 + \rho_3$, $\kappa_2 = \mu_3 + \mu_4$, $r_w = X^TY\gamma_1^k + \mu_1 X^TY(e-a^k) - \gamma_2^k + \mu_2 c^k + \rho_3 D^Tv^k - \rho_1 B^Tu^k$, and $r_b = e^TY\gamma_1^k + \mu_1 e^TY(e-a^k) + \gamma_3^k + \mu_3(d^Tu^k+1-q^k) - \gamma_4^k - \mu_4(g^Tv^k+1-p^k)$.

According to a further aspect of the invention, $$\begin{pmatrix} \kappa_1 I + \mu_1 X^T X & \mu_1 X^T e \\ \mu_1 e^T X & \mu_1 N + \kappa_2 \end{pmatrix} \begin{pmatrix} w^{k+1} \\ b^{k+1} \end{pmatrix} = \begin{pmatrix} r_w \\ r_b \end{pmatrix}$$

is solved using a preconditioned conjugate gradient method.

According to a further aspect of the invention, updating constraint variables u and v comprises solving $(\rho_1 BB^T + \mu_3 dd^T + \mu_5 I) u^{k+1/2} = r_u$, wherein $r_u = \rho_1 Bw^{k+1} + \mu_3 db^{k+1} + \mu_3 d(q^k - 1) - d\gamma_3^k + \gamma_5 + \mu_5 s^k$, and $(\rho_3 DD^T + \mu_4 gg^T \mu_6 I) v^{k+1} = r_v$, where $r_v = \rho_3 Dw^{k+1} - \mu_4 gb^{k+1} - g\gamma_4^k - \mu_4 g(1-p^k) + \gamma_6 + \mu_6 t^k$, and slack variables s and t are updated according to $$s^{k+1} = \max\left(0, u^{k+1} - \frac{\gamma_5^k}{\mu_5}\right)$$

and $$t^{k+1} = \max\left(0, v^{k+1} - \frac{\gamma_6^k}{\mu_6}\right).$$

According to a further aspect of the invention, the auxiliary variables a, c, p and q are updated according to $$a^{k+1} = S_{\frac{1}{N\mu_1}}\left(e + \frac{\gamma_1^k}{\mu_1} - Y(Xw^{k+1} + b^{k+1}e)\right),$$

$$c^{k+1} = T_{\frac{\lambda_1}{\mu_2}}\left(\frac{\gamma_2^k}{\mu_2} + w^{k+1}\right),$$

$$q^{k+1} = S_{\frac{\rho_2}{\mu_3}}\left(d^T u^k - b^{k+1} + 1 + \frac{\gamma_3^k}{\mu_3}\right),$$

$$p^{k+1} = S_{\frac{\rho_4}{\mu_4}}\left(g^T v^k + b^{k+1} + 1 + \frac{\gamma_4^k}{\mu_4}\right),$$

wherein $$S_\lambda(\omega) = \begin{cases} \omega - \lambda, & \omega > \lambda, \\ 0, & 0 \le \omega \le \lambda, \\ \omega, & \omega < 0; \end{cases}$$

and $T_\lambda(\omega) = \text{sgn}(\omega) \max\{0, |\omega| - \lambda\}$.

According to a further aspect of the invention, the Lagrangian multipliers $\gamma_1^{k+1}$, $\gamma_2^{k+1}$, $\gamma_3^{k+1}$, $\gamma_4^{k+1}$, $\gamma_5^{k+1}$, and $\gamma_6^{k+1}$ are updated according to $\gamma_1^{K+1} \leftarrow \gamma_1^K + \mu_1(e - Y(Xw^{k+1} + b^{k+1}e) - a^{k+1})$, $\gamma_2^{K+1} \leftarrow \gamma_2^K + \mu_2(w^{k+1} - c^{k+1})$, $\gamma_3^{K+1} \leftarrow \gamma_3^K + \mu_3(d^T u^{k+1} - b^{k+1} - q^{k+1} + 1)$, $\gamma_4^{K+1} \leftarrow \gamma_4^K + \mu_4(g^T v^{k+1} + b^{k+1} - p^{k+1} + 1)$, $\gamma_5^{K+1} \leftarrow \gamma_5^K + \mu_5(s^{k+1} - u^{k+1})$, and $\gamma_6^{K+1} \leftarrow \gamma_6^K + \mu_6(t^{k+1} - v^{k+1})$.

According to a further aspect of the invention, the convex quadratic program solver minimizes a quadratic program $\frac{1}{2}\beta^T H \beta + f^T \beta$ with respect to $\beta$ subject to $$\begin{cases} a_l \le A\beta \le a_u, \\ x_l \le \beta \le x_u, \end{cases}$$

wherein $\beta = (w, b, \xi, u, v, \eta_u, \eta_v) \in R^M$, $M = m + n + k_1 + k_2 + 3$, $f = (0, 0, ce^T, 0, 0, \rho_2, \rho_4)$, $$H = \begin{pmatrix} (1+\rho_1+\rho_3)I_m & 0 & \rho_1 B^T & -\rho_3 D^T & 0 \\ & 0 & & & \\ \rho_1 B & 0 & \rho_1 BB^T & & 0 \\ -\rho_3 D & 0 & & \rho_3 DD^T & 0 \\ & 0 & & & \end{pmatrix}$$

$$A = \begin{pmatrix} \bar{X} & y & I_n & 0 & 0 & 0 & 0 \\ 0 & -1 & 0 & d^T & 0 & -1 & 0 \\ 0 & 1 & 0 & 0 & g^T & 0 & -1 \end{pmatrix},$$

$$a_l = \begin{pmatrix} e \\ 0 \\ 0 \end{pmatrix},$$

$$a_u = \begin{pmatrix} 0 \\ -1 \\ -1 \end{pmatrix},$$

and the values of $x_l$, $x_u = \pm\infty$, respectively, for w, and $x_l = 0$, $x_u = \infty$ for the other components of $\beta$.

According to another aspect of the invention, there is provided a non-transitory program storage device readable by a computer, tangibly embodying a program of instructions executed by the computer to perform the method steps for training a classifier for selecting features in sparse data sets with high feature dimensionality that incorporates prior domain knowledge

BRIEF DESCRIPTION OF THE DRAWINGS

FIG. 3 is a flowchart of a hybrid interior point and alternating direction algorithm for bottom-level training of a classifier, according to an embodiment of the invention.

FIGS. 4A-B is a flowchart of an ADMM algorithm for solving an elastic net support vector machine (ENSVM) that incorporates domain knowledge, according to an embodiment of the invention.

FIG. 5 is a flowchart of a two-phase algorithm for an elastic-net KSVM that incorporates domain knowledge, according to an embodiment of the invention.

FIG. 8 is a table that presents a comparison of prediction accuracies of HIPAD, ADMM, and LIBSVM on the synthetic data, according to an embodiment of the invention.

FIG. 9 is a table that summarizes the real data sets, according to an embodiment of the invention.

FIG. 10 is a table that summarizes the experiment results for the real data sets, according to an embodiment of the invention.

FIG. 11 is a table that summarizes the experimental results for a HIPAD-ENK according to an embodiment of the invention and a ADMM-ENKSVM according to an embodiment of the invention on synthetic data are presented.

FIG. 13 (bottom) is a plot of the solution w returned by a HIPAD-ENK according to an embodiment of the invention on the data set ksvm-s-10k when d=g=0

DETAILED DESCRIPTION OF EXEMPLARY EMBODIMENTS

Figure 1:
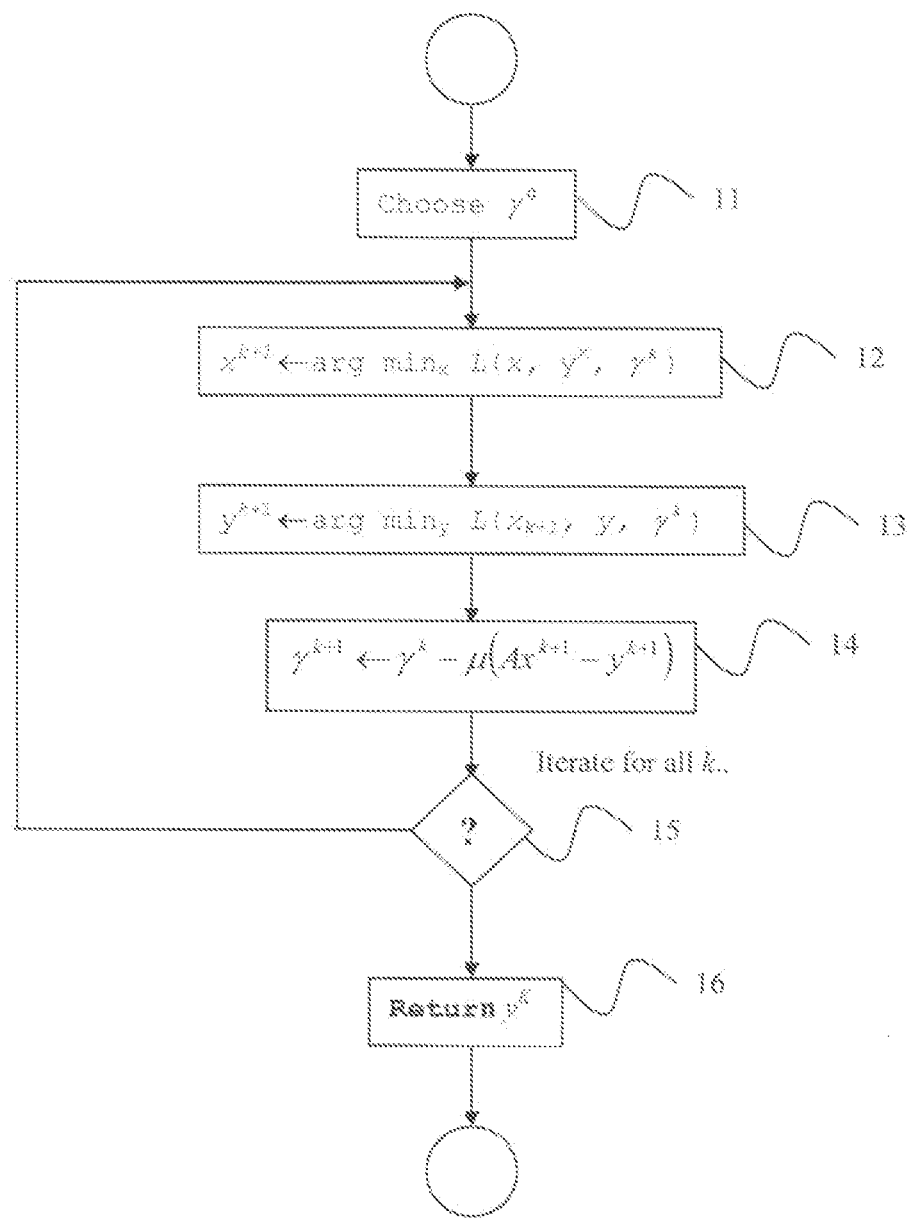
FIG. 1 is a flowchart of the general form of an alternating directions method of multipliers (ADMM) algorithm, according to an embodiment of the invention.

Exemplary embodiments of the invention as described herein generally include systems and methods for hybrid interior-point alternating directions for support vector machines and feature selection. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Mathematical Notation: All matrices are expressed in uppercase Latin letters. Lowercase Latin letters in bold denote vectors, and those in plain typeface denote scalars. Greek letters can be either vectors or scalars depending on the context. The sample-label pairs are denoted by $(x_i, y_i)$, $i=1, \ldots, N$, where N is the number of samples, and $x_i \in \mathbb{R}^m$. $x_i$ is the i-th entry in a vector x.

1. A Two-Phase Hybrid Algorithm

According to an embodiment of the invention, for data sets with many features, the high dimensionality feature space still poses a computational challenge for the interior-point methods (IPM). Fortunately, many data sets of this kind, such as text documents, are sparse, and the resulting classifier w is also expected to be sparse, i.e. only a small subset of the features are expected to carry significant weights in classification. Obviously, IPM should train a classifier only on the most important features. According to an embodiment of the invention, a two-phase algorithm can appropriately shrink the feature space to leverage the high accuracy of IPM while maintaining efficiency. Specifically, a first phase of an according to an embodiment of the invention can solve an elastic-net support vector machine (ENSVM) or doubly-regularized SVM (DrSVM). The elastic-net regularization performs feature selection with a grouping effect and has been shown to be effective on data sets with many but sparse features and high local correlations. This is the case for text classification data, microarray gene expression, and fMRI data sets. The support of the weight vector w usually stabilizes well before the algorithm converges to the optimal solution. Taking advantage of that stabilization, the first phase of the hybrid algorithm can be terminated early and a second phase can solve a standard SVM with the reduced feature set using a solver that implements an IPM.

1.1. ENSVM and ADMM

A support vector machine (SVM) can be written in the regularized regression form as:

$$\min_{w,b} \frac{1}{N} \sum_{i=1}^{N} (1 - (y_i(x_i^T w + b)))_+ + \frac{\lambda}{2} \|w\|_2^2 \quad (1)$$

where the first term is an averaged sum of the hinge losses and the second term can be viewed as a ridge regularization on w. One may see from this form that a standard SVM does not enforce sparsity in the solution, and w is expected to be completely dense. The ENSVM adds an $L_1$ regularization on top of the ridge regularization term, giving:

$$\min_{w,b} \frac{1}{N} \sum_{i=1}^{N} (1 - (y_i(x_i^T w + b)))_+ + \lambda_1 \|w\|_1 + \frac{\lambda_2}{2} \|w\|_2^2 \quad (2)$$

The resulting regularization $$\lambda_1 \|w\|_1 + \frac{\lambda_2}{2} \|w\|_2^2$$

is the same as that used in an elastic-net regression, which can select highly correlated features in groups (i.e. the grouping effect) while still enforcing sparsity in the solution. This is a useful feature for classification of text documents, which is common in the hierarchical classification setting. Adopting elastic-net regularization as in EQ. (2) yields the same benefit to SVM for training classifiers.

To approximately solve EQ. (2), embodiments of the invention use hybrid methods that efficiently combine an alternating directions method of multipliers (ADMM) with an IPM. ADMM is an extreme case of the inexact augmented Lagrangian (IAL) method for the structured unconstrained system $$\min_x F(x) \equiv f(x) + g(Ax) \quad (3)$$

where both functions f( ) and g( ) are convex. These two functions can be decoupled by introducing an auxiliary variable y to convert EQ. (3) into an equivalent constrained formulation:

$$\min_{x,y} f(x) + g(y) \quad (4)$$
$$\text{s.t.} \quad Ax = y.$$

This technique is often called variable-splitting. Here, x and y are used as generic variables. An IAL method minimizes in each iteration the augmented Lagrangian of EQ. (4)

$$L(x, y, \gamma) := f(x) + g(y) + \gamma^T(y - AX) + \frac{\mu}{2} \|Ax - y\|_2^2 \quad (5)$$

approximately, followed by an update to the Lagrange multiplier $\gamma \leftarrow \gamma - \mu(Ax-y)$. The IAL method is guaranteed to converge to the optimal solution of EQ. (3), as long as the augmented Lagrangian can be approximately minimized with an increasing accuracy. ADMM can be viewed as a practical implementation of IAL, where the task of approximately minimizing $L(x, y, \gamma)$ is performed with respect to x and y alternating once. The general form of an ADMM according to an embodiment of the invention is stated in Algorithm 1, with reference to the steps of the flowchart of FIG. 1:

| Algorithm 1 ADMM | |
|---|---|
| 1  Choose $\gamma^0$. | (Step 11) |
| 2  for k = 0, 1, . . . , K do | |
| 3    $x^{k+1} \leftarrow \arg\min_x L(x, y^k, \gamma^k)$ | (Step 12) |
| 4    $y^{k+1} \leftarrow \arg\min_y L(x_{k+1}, y, \gamma^k)$ | (Step 13) |
| 5    $\gamma^{k+1} \leftarrow \gamma^k - \mu(Ax^{k+1} - y^{k+1})$ | (Step 14) |
| 6  end for | (Step 15) |
| 7  return $y^K$ | (Step 16) |

It can be shown that ADMM converges for the case of two-way splitting as in Algorithm 1:

Theorem 1. Consider EQ. (3), where both f and g are proper, closed, convex functions, and $A \in R^{n \times m}$ has full column rank. Then, starting with an arbitrary $\mu > 0$ and $x^0$, $y^0 \in R^m$, the sequence $\{x^k\}$ generated by Algorithm 1.1 converges to a solution $x^*$ of EQ. (3), if EQ. (3) has a solution. If EQ. (3) does not have a solution, at least one of the sequences $\{x^k\}$ and $\{y^k\}$ diverges.

A variable-splitting and ADMM according to an embodiment of the invention applied to EQ. (2) uses auxiliary variables (a, c) and linear constraints so that the non-smooth hinge loss and $L_1$-norm in the objectives function are decoupled, allowing optimization over each single auxiliary variable. Specifically, EQ. (2) can be transformed into an equivalent form:

$$\min_{w,b,a,c} \frac{1}{N} \sum_{i=1}^{N} a_i + \lambda_1 \|c\|_1 + \frac{\lambda_2}{2} \|w\|_2^2 \quad (5)$$

$$\text{s.t.} \quad a = e - Y(Xw + be),$$

$$c = w.$$

The augmented Lagrangian, $$L(w, b, a, c, \gamma_1, \gamma_2) := \quad (6)$$

$$\frac{1}{N} \sum_{i=1}^{N} a_i + \lambda_1 \|c\|_1 + \frac{\lambda_2}{2} \|w\|_2^2 + \gamma_1^T (e - Y(Xw + be) - a) +$$

$$\gamma_2^T (w - c) + \frac{\mu_1}{2} \|e - Y(Xw + be) - a\|_2^2 + \frac{\mu_2}{2} \|w - c\|_2^2$$

is then alternately minimized with respect to (w, b), a, and c in each iteration, followed by an update to the Lagrange multipliers $\gamma_1$ and $\gamma_2$. The original formulation is thus decomposed into three subsystems that include computing the proximal operator of the hinge loss function (with respect to a), solving a special linear system (with respect to (w, b)), and performing a soft-thresholding operation (with respect to c), which can all be performed efficiently. In particular, the linear system at Line 3 of Algorithm 1 can be solved by a small number of preconditioned conjugate gradient (PCG) iterations, however, other methods as are known in the art may also be used, such as a Cholesky Decomposition or an LU factorization.

Before presenting a two-phase algorithm according to an embodiment of the invention for bottom-level training in Algorithm 2, the following operators are defined:

$$S_\lambda(\omega) = \begin{cases} \omega - \lambda, & \omega > \lambda; \\ 0, & 0 \leq \omega \leq \lambda; \\ \omega, & \omega < 0. \end{cases}$$

(Proximal operator associated with hinge loss)

$$T_\lambda(\omega) = sgn(\omega) \max\{0, |\omega| - \lambda\}.$$

(Shrinkage operator)

Both of these operators apply component-wise to the input vector w.

An exemplary, non-limiting alternating direction algorithm for training an elastic-net support vector machine is as follows, with reference to the steps in the flowchart of FIG. 2.

| Algorithm 2: ADMM-ENSVM | |
|---|---|
| 1.  Input: $w^0, b^0, a^0, c^0, \gamma_1^0, \gamma_2^0$ | |
| 2.  for k = 0, 1, . . . , K - 1 do | |
| 3.    $(w^{k+1}, b^{k+1}) \leftarrow$ PCG solution of the structured linear system | |
| $\begin{pmatrix} (\lambda_2 + \mu_2)I + \mu_1 X^T X & \mu_1 X^T e \\ \mu_1 e^T X & \mu_1 N \end{pmatrix} \begin{pmatrix} w^{k+1} \\ b^{k+1} \end{pmatrix} = \begin{pmatrix} X^T Y \gamma_1^k - \mu_1 X^T Y(a^k - e) - \gamma_2^k + \mu_2 c^k \\ e^T Y \gamma_1^k - \mu_1 e^T Y(a_k - e) \end{pmatrix}$ | (step 20 of FIG. 2) |
| 4.    $a^{k+1} \leftarrow S_{1/N\mu_1}\left(e + \frac{\gamma_1^k}{\mu_1} - Y(Xw^{k+1} + b^{k+1}e)\right)$ | (step 21 of FIG. 2) |
| 5.    $c^{k+1} \leftarrow T_{\lambda_1/\mu_2}\left(\frac{\gamma_2^k}{\mu_2} + w^{k+1}\right)$ | (step 22 of FIG. 2) |
| 6.    $\gamma_1^{k+1} \leftarrow \gamma_1^k + \mu_1(e - Y(Xw^{k+1} + b^{k+1}e) - a^{k+1})$ | (step 23 of FIG. 2) |
| 7.    $\gamma_2^{k+1} \leftarrow \gamma_2^k + \mu_2(w^{k+1} - c^{k+1})$ | (step 24 of FIG. 2) |
| 8.  end for | (step 25 of FIG. 2) |
| 9.  return $(w^{K-1}, b^{K-1})$ | (step 26 of FIG. 2) |

In line 3, above, the N appearing in the lower right of the matrix on the left-hand side of the linear system is a matrix with N's in the main diagonal, where N is the number of samples. Note that Theorem 1 does not apply to a general k-wise update of the variables, where k>2. The above application of ADMM to ENSVM according to an embodiment of the invention may first appear to employ a three-split of the variables, but the updates of a and c are actually independent from each other, given (w, b). Hence, these two updates can be viewed as a single update, performed simultaneously, leading to a two-way update of the variables (w, b) and (a, c), and Theorem 1 still applies in this case.

1.2 A Two-Phase Algorithm

A first phase of an algorithm according to an embodiment of the invention can appropriately reduce the feature space dimensionality without impacting the final prediction accuracy. As discussed above, the suitability of ADMM for the first phase depends on the support of the feature vector quickly converges. Here, this is empirically demonstrated.

An exemplary data set has 50 samples with 300 features each. An ADMM according to an embodiment of the invention converged in 558 iterations. The output classifier w contains only 13 non-zero features, and the feature support converged in less than 50 iteration. Hence, one should monitor the change in the signs and indices of the support and terminate the first phase promptly. An embodiment of the invention uses the following criterion to monitor the relative change in the iterates as a surrogate of the change in the support:

$$\frac{\|w^{k+1} - w^k\|}{\max(\|w^k\|, 1)} < \varepsilon_{tol} \tag{7}$$

Figure 2:
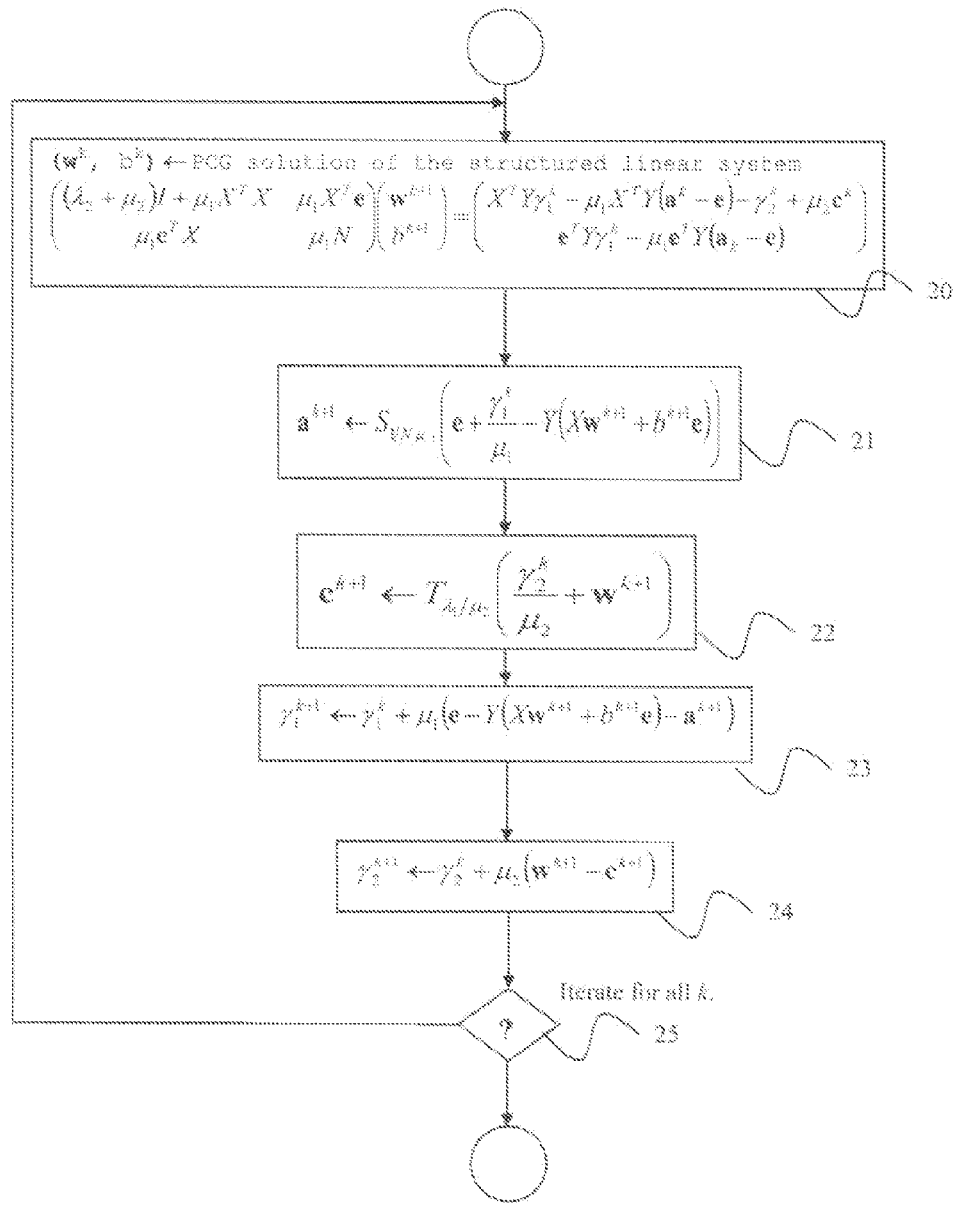
FIG. 2 is a flowchart of an ADMM algorithm for solving an elastic net support vector machine (ENSVM), according to an embodiment of the invention.

Thus, in the algorithm of FIG. 2, the loop over k would break when the condition of EQ. (7) is satisfied. Experiments of embodiments of the invention showed that when the change over the iterates is small, the evolution of the support indices also stabilizes.

Upon starting a second phase of an algorithm according to an embodiment of the invention, the IPM should warm-start from the corresponding sub-vector of the ADMM solution. IPM is also applied during the second phase to solve the standard SVM using an $L_2$-regularization instead of the ENSVM used in the first phase. Although ENSVM can be reformulated as a quadratic program (QP), the size of the system is larger than an SVM due to the additional linear constraints introduced by the $L_1$-norm. In addition, since the feature support has been at least approximately identified in the first phase of the algorithm, enforcing sparsity in the reduced feature space becomes less critical.

An exemplary, non-limiting hybrid interior point and alternating direction algorithm for bottom-level training of a classifier is as follows, with reference to the steps in the flowchart of FIG. 3.

---

Algorithm 3: A Hybrid Interior Point and Alternating Direction method

1. Input: $w^0, b^0, a^0, c^0, \gamma_1^0, \gamma_2^0$ (Step 31)
2. // PHASE 1: ADMM for ENSVM
3. $(w^{ADMM}, b^{ADMM}) \leftarrow$ ADMM-ENSVM$(w^0, b^0, a^0, c^0, \gamma_1^0, \gamma_2^0)$ (Step 32)
4. // PHASE 2: IPM for SVM
5. $\tilde{w} \leftarrow$ non-zero components of $w^{ADMM}$ (Step 33)

---

-continued

Algorithm 3: A Hybrid Interior Point and Alternating Direction method

6. $(\tilde{X}, \tilde{Y}) \leftarrow$ sub-matrices of (X, Y) corresponding to the support of $w^K$ (Step 34)
7. $(w, b) \leftarrow$ SVM-IPM$(\tilde{X}, \tilde{Y}, \tilde{w}, b)$ (Step 35)
8. return (w, b) (Step 36)

---

Note that in embodiments of the invention, the ADMM-ENSVM of Phase 1 will use the stopping criteria of EQ. (7) rather than looping over all k. According to embodiments of the invention, the system being solved in Phase 2 of Algorithm 3 is much smaller than the system being solved in Phase 1. An IPM according to an embodiment of the invention uses second order derivative information, so that it can converge much faster than a method using first order derivatives. However, an IPM needs to store a Hessian matrix of second derivatives, which requires $n^2$ storage elements for an output vector of n elements. If the full vector output by Phase 1 is passed to an IPM solver according to an embodiment of the invention, the storage required for the Hessian matrix by the IPM solver would be prohibitive. Also, the solution of the Newton system of equations would be time consuming (order $n^2$ in the number of features). However, the number of non-zero elements of the $w^{ADMM}$ output by Phase 1 would typically be several orders of magnitude less than the full vector, and thus an IPM solver according to an embodiment of the invention would be able to handle the storage requirements for the non-zero elements.

2. SVM Via Interior-Point Method

An exemplary, non-limiting method according to an embodiment of the invention for solving an SVM using IPM makes use of an open source, publicly available QP solver known as OOQP, a software package for convex quadratic programming that is disclosed in E. Gertz, S. Wright, "Object-oriented software for quadratic programming", *ACM Transactions on Mathematical Software (TOMS)*, 29(1):58-81, 2003, the contents of which are herein incorporated by reference in their entirety. The OOQP Package is an object-oriented implementation of a primal-dual interior-point algorithm in C++ for the general convex QP system:

$$\min_{\beta} \frac{1}{2}\beta^T H \beta + f^T \beta, \tag{8}$$

$$a_l \leq A\beta \leq a_u,$$

$$A_{eq}\beta = a_{eq},$$

$$x_l \leq \beta \leq x_u.$$

In a HIPAD method according to an embodiment of the invention, the SVM is formulated as a linearly equality-constrained convex QP. Hence, the first set of constraints in EQ. (8) can be ignored.

The primal formulation of an SVM (PSVM) according to an embodiment of the invention is $$\min_{w,b,s,\xi} \frac{1}{2} w^T w + c e^T \xi \tag{9}$$

$$\text{s.t.} \quad y_i(w^T x_i - b) - s_i + \xi_i = 1, \quad i = 1, \ldots, N,$$

$$s \geq 0, \xi \geq 0,$$

where c is a user-defined penalty parameter for $\xi$. The Hessian H from EQ. (8) is simply an augmented identity padded with zeros at the diagonal entries corresponding to (b, $\xi$, s).

The dual (DSVM) of the PSVM of EQ. (9) is $$\min_{\alpha} \frac{1}{2}\alpha^T Q\alpha - e^T \alpha \tag{10}$$
$$\text{s.t.} \quad y^T\alpha = 0,$$
$$0 \le \alpha_i \le c, \quad i = 1, \ldots, N,$$

where $Q_{ij}=y_i y_j x_i^T x_j = \overline{XX}^T$. In the notation of EQ. (8), H=Q, $A_{eq}=y^T$, and $\alpha_{eq}=0$. The optimal solution, by considering the KKT conditions of EQS. (9) and (10) is given by $$w = \overline{X}^T \alpha = \sum_{i \in SV} \alpha_i y_i x_i,$$

where SV is the set of sample indices corresponding to the support vectors. The optimal bias term b can be computed from the complementary slackness condition $$\alpha_i(y_i(x_i^T w + b) - 1 + \xi_i)$$

Whether to solve EQ. (9) (SVM-P) or EQ. (10) (SVM-D) for a given data set depends on its dimensions as well as sparsity. If X is a sparse matrix, Q in (SVM-D) is still likely to be dense, whereas the Hessian matrix in (SVM-P) is the identity. The primal formulation (SVM-P), however, has a larger variable dimension and more constraints. In the context of the classification tasks considered herein, since IPM is used in the second phase, the number of non-zero features (m) is relatively small, and the number of observations (N) may be assumed small too. When m<N or X is sparse, embodiments of the invention may solve (SVM-P). For dense systems with m≥N, embodiments of the invention may solve (SVM-D), since computing $Q=\overline{XX}^T$ is inexpensive and Q is only of N×N. In experiments of embodiments of the invention, (SVM-D) was solved for all the data sets for simplicity, however, those of skill in the art will readily recognize that (SVM-P) could also be solved in other embodiments.

3. Domain Knowledge Incorporation

Often, one has prior domain knowledge for specific classification tasks. Domain knowledge is most helpful when the training data does not form a comprehensive representation of the underlying unknown population, resulting in poor generalization performance of SVM on the unseen data from the same population. This often arises in situations where labeled training samples are scarce, while there is an abundance of unlabeled data. A simple two-dimensional example is used to illustrate this idea in FIG. 6. The solid line 61 in FIG. 6 is the SVM solution based on the training data, while the dotted line 62 is the solution of SVM trained on the entire population.

Figures 6, 7:
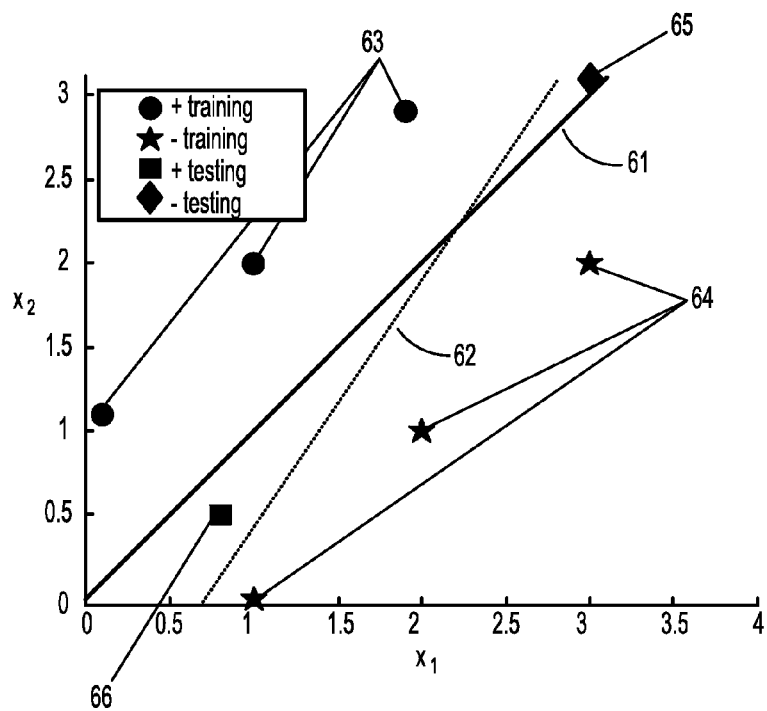
FIG. 6 shows a 2D example that illustrates the negative effect of under-sampling on SVM, according to an embodiment of the invention.
FIG. 7 is a table that summarizes the attributes of the synthetic data sets, according to an embodiment of the invention.

The optimal separating hyperplane obtained from SVM for the training points 63, 64 is clearly the line with equal distance to the two axes, the solid line 61 in FIG. 6. However, both test points 65, 66 lie on the 'wrong' side of the hyperplane because the true hyperplane for the entire population is quite different from the SVM solution as illustrated by the dotted line 62 in FIG. 6.

For high dimensional data, ENSVM performs feature selection during training to produce a simpler model and to achieve better prediction accuracy. However, the quality of the feature selection depends entirely on the training data. In cases like the one described above, the feature support identified by ENSVM may not form a good representation of the population. Hence, when domain knowledge about certain features is available, it should be taken into consideration during the training phase and the relevant features in the feature support should then be deemed important for classification.

Embodiments of the invention can incorporate domain knowledge in the form of class-membership information associated with features. In the context of the previous example, such knowledge could be implication relationships as follows: Every data sample x with feature $x_2$ greater than 2 should be classified as negative, and every sample x which lies on the negative side of the hyperplane $$f = \begin{pmatrix} 1.0 \\ -1.55 \end{pmatrix},$$
$$f_0 = -0.9,$$
i.e. $f^T x + f_0 \le 0,$ should be classified to the positive class. Such information can be incorporated (or such rules be enforced) in a SVM by adding equivalent linear constraints to the SVM QP formulation (KSVM). To be specific, the above information can be modeled with the linear implication $$Bx \le d \Rightarrow w^T x + b \ge 1, \tag{11}$$

where $B \in R^{k_1 \times m}$ and $d \in R^{k_1}$ where $k_1$ is the number of positive class constraints. It can be shown that by utilizing the nonhomogeneous Farkas theorem of the alternative, EQ. (11) can be transformed into the following equivalent system of linear inequalities with a solution u:

$$B^T u + w = 0, d^T u - b + 1 \le 0, u \ge 0 \tag{12}$$

For the sake of completeness, embodiments of the invention can consider the following linear implication for the negative class membership:

$$Dx \le g \Rightarrow w^T x + b \le -1, D \in R^{k_2 \times m}, g \in R^{k_2}, \tag{13}$$

where $k_2$ is the number of negative class constraints, which can be similarly represented by the set of linear equations in v:

$$D^T v - w = 0, g^T v + b + 1 \le 0, v \ge 0. \tag{14}$$

Hence, to incorporate the domain knowledge represented by EQS. (11) and (13) into an SVM according to an embodiment of the invention, one can add the linear constraints of EQS. (12) and (14) to EQ. (9) (SVM-P):

$$\min_{w,b,s,\xi} \frac{1}{2}w^T w + ce^T \xi + \frac{\rho_1}{2}\|B^T u + w\|_1 + \frac{\rho_2}{2}\|D^T v - w\|_1 \tag{15}$$
$$\text{s.t.} \quad y_i(w^T x_i - b) - s_i + \xi_i = 1, \quad i = 1, \ldots, N,$$
$$d^T u - b + 1 \le 0,$$
$$g^T v + b + 1 \le 0,$$
$$(s, \xi, u, v) \ge 0.$$

If the data from the two classes is not linearly separable with the augmented constraint set, one can modify EQ. (9) (SVM-P) as follows to form a soft-margin formulation:

$$\min_{w,b,\xi,u,v,\eta_u,\eta_v} \frac{1}{2}w^T w + ce^T\xi + \frac{\rho_1}{2}\|B^T u + w\|_1 + \qquad (16)$$
$$\rho_2\eta_u + \frac{\rho_3}{2}\|D^T v - w\|_1 + \rho_4\eta_v$$
s.t. $y_i(w^T x_i + b) \geq 1 - \xi_i = 1, \quad i = 1, \ldots, N,$
$d^T u - b + 1 \leq \eta_u,$
$g^T v + b + 1 \leq \eta_v,$
$(\xi, u, v, \eta_u, \eta_v) \geq 0.$ The two $L_1$-norm terms in the objective function come from the relaxation of the equality constraints, (e.g. $B^T u + w = 0$) to the corresponding box constraints (e.g. $-z_u \leq B^T u + w \leq z_u$). Compared to EQ. (9) (SVM-P), this formulation, with the $L_1$ terms expressed as box constraints, increases both the variable dimension and the number of linear constraints by at least 2m. This is clearly undesirable when m is large, which is the scenario considered herein.

Note that if the quadratics $\|B^T u + w\|_2^2$ and $\|D^T v - w\|_2^2$ penalized instead of their $L_1$ counterparts, the above optimization formulation is a smaller convex QP. This is due to the non-differentiability of the $L_1$ norm at zero, since it is a sum of absolute values, which effectively doubles the number of constraints. Hence, embodiments of the invention consider the following primal formulation for domain knowledge incorporation (KSVM-P):

$$\min_{w,b,\xi,u,v,\eta_u,\eta_v} \frac{1}{2}w^T w + ce^T\xi + \frac{\rho_1}{2}\|B^T u + w\|_2^2 + \qquad (17)$$
$$\rho_2\eta_u + \frac{\rho_3}{2}\|D^T v - w\|_2^2 + \rho_4\eta_v$$
s.t. $y_i(w^T x_i + b) \geq 1 - \xi_i = 1, \quad i = 1, \ldots, N,$
$d^T u - b + 1 \leq \eta_u,$
$g^T v + b + 1 \leq \eta_v,$
$(\xi, u, v, \eta_u, \eta_v) \geq 0.$ Embodiments of the invention can combine ENSVM and KSVM, and embodiments of the invention can solve the combined system in a HIPAD framework. This combination can exploit domain knowledge to improve the feature selection, and hence, the generalization performance of HIPAD.

3.1 ADMM Phase

Embodiments of the invention can use ADMM to solve an elastic-net SVM that incorporates domain knowledge. First, EQS. (2) and (17) can be combined, and the resulting optimization formulation can be written in an equivalent unconstrained form by penalizing the violation of the inequality constraints through hinge losses in the objective function (ENK-SVM):

$$\min_{w,b,u\geq 0, v\geq 0} F(w, b, u, v) \qquad (18)$$

where $$F(w, b, u, v) \equiv$$
$$\frac{\lambda_2}{2}\|w\|_2^2 + \lambda_1\|w\|_1 + \frac{1}{N}\sum_{i=1}^{N}(1 - y_i(x_i^T w + b))_+ + \frac{\rho_1}{2}\|B^T u + w\|_2^2 +$$

$$\rho_2(d^T u - b + 1)_+ + \frac{\rho_3}{2}\|D^T v - w\|_2^2 + \rho_4(g^T v + b + 1)_+.$$

Variable-splitting can then be applied to decouple the $L_1$-norms and hinge losses and obtain the following objective function $$F(w, b, u, v, a, c, p, q) \equiv \frac{\lambda_2}{2}\|w\|_2^2 + \lambda_1\|c\|_1 +$$
$$\frac{1}{N}e^T(a)_+ + \frac{\rho_1}{2}\|B^T u + w\|_2^2 + \rho_2(q)_+ + \frac{\rho_3}{2}\|D^T v - w\|_2^2 + \rho_4(p)_+$$

and equivalent constrained optimization formulation:

$$\min_{w,b,u,v,a,c,p,q} F(w, b, u, v, a, c, p, q) \qquad (19)$$
s.t. $c = w,$
$a = e - (\overline{X}w + yb),$
$q = d^T u - b + 1,$
$p = g^T v + b + 1,$
$u \geq 0, v \geq 0.$ Embodiments of the invention then form the augmented Lagrangian L of the system of EQ. (19):

$$\mathcal{L} = F(w, b, u, v, a, c, p, q) + \gamma_1^T(e - (\overline{X}w + yb) - a) + \qquad (20)$$
$$\frac{\mu_1}{2}\|e - (\overline{X} + yb) - a\|_2^2 + \gamma_2^T(w - c) + \frac{\mu_2}{2}\|w - c\|_2^2 +$$
$$\gamma_3(d^T u - b + 1 - q) + \frac{\mu_3}{2}\|d^T u - b + 1 - q\|_2^2 +$$
$$\gamma_4(g^T v + b + 1 - p) + \frac{\mu_4}{2}\|g^T v + b + 1 - p\|_2^2$$

and minimize L with respect to w, b, c, a, p, q, u, v individually and in order. For the sake of readability, the non-negative constraints are not penalized for u and v in the augmented Lagrangian for the moment.

Given $(a^k, c^k p^k, q^k)$, solving for (w, b) again involves solving a linear system $$\begin{pmatrix} \kappa_1 I + \mu_1 X^T X & \mu_1 X^T e \\ \mu_1 e^T X & \mu_1 N + \kappa_2 \end{pmatrix} \begin{pmatrix} w^{k+1} \\ b^{k+1} \end{pmatrix} = \begin{pmatrix} r_w \\ r_b \end{pmatrix} \qquad (21)$$

where $\kappa_1 = \lambda_2 + \mu_2 + \rho_1 + \rho_3,$ $\kappa_2 = \mu_3 + \mu_4,$ $r_w = X^T Y \gamma_1^k + \mu_1 X^T Y(e - a^k) - \gamma_2^k + \mu_2 c^k + \rho_3 D^T v^k - \rho_1 B^T u^k,$ and $r_b = e^T Y \gamma_1^k + \mu_1 e^T Y(e - a^k) + \gamma_3^k + \mu_3(d^T u^k + 1 - q^k) - \gamma_4^k - \mu_4(g^T v^k + 1 - p^k).$ As with the linear system of Algorithm 2, above, the N in the lower right of the matrix on the left-hand side is a matrix with diagonal elements equal to N. Similar to solving the linear system in Algorithm 2, the solution to the above linear system can be computed through a few PCG iterations, taking advantage of the fact that the left-hand-side matrix is of low-rank. Note however, that other methods as are know to those of skill in the art can be used to solve EQ. (21), such as Cholesky decomposition or LU factorization.

To minimize the augmented Lagrangian with respect to u, embodiments of the invention can solve a convex quadratic formulation with non-negative constraints:

$$\min_{u \geq 0} \frac{\rho_1}{2} \|B^T u + w^{k+1}\|_2^2 + \gamma_3^k d^T u + \frac{\mu_3}{2} \|d^T u - b^{k+1} + 1 - q^k\|_2^2. \quad (22)$$

Obtaining a closed-form solution to the above formulation through a direct approach is challenging. However, by introducing a slack variable s and transferring the non-negative constraint on u to s, the formulation of EQ. (22) can be decomposed into two parts:

$$\min_{u,s \geq 0} \frac{\rho_1}{2} \|B^T u + w^{k+1}\|_2^2 + \gamma_3^k d^T u + \frac{\mu_3}{2} \|d^T u - b^{k+1} + 1 - q^k\|_2^2 \quad (23)$$

$$\text{s.t. } u - s = 0.$$

Penalizing the linear constraint u−s=0 in the new augmented Lagrangian, the new subsystem with respect to (u, s) is $$\min_{u,s \geq 0} \frac{\rho_1}{2} \|B^T u + w^{k+1}\|_2^2 + \gamma_3^k d^T u + \quad (24)$$

$$\frac{\mu_3}{2} \|d^T u - b^{k+1} + 1 - q^k\|_2^2 + \gamma_5^T (s - u) + \frac{\mu_5}{2} \|u - s\|_2^2.$$

Given an $s^k \geq 0$, one can compute $u^{k+1}$ by solving a $k_1 \times k_1$ linear system:

$$(\rho_1 BB^T + \mu_3 dd^T + \mu_5 I)u^{k+1/2} = r_u, \quad (25)$$

where $$r_u = -\rho_1 Bw^{k+1} + \mu_3 db^{k+1} + \mu_3 d(q^k - 1) - d\gamma_3^k + \gamma_5 + \mu_5 s^k.$$

Embodiments of the invention can assume that B is full row-rank. This is a reasonable assumption since otherwise there is at least one redundant domain knowledge constraint which can be removed. The number of domain knowledge constraints $k_1$ and $k_2$ are usually small, so EQ. (25) can be solved exactly and efficiently. An exemplary, non-limiting method for solving EQ. (25) uses a Cholesky factorization.

Embodiments of the invention can solve for the $s^{k+1}$ corresponding to $u^{k+1}$ by observing that EQ. (24) is separable in the elements of s. For each element $s_i$, an optimal solution to the one-dimensional quadratic formulation with a non-negative constraint on $s_i$ is given by $$\max\left(0, u_i - \frac{(\gamma_5)_i}{\mu_5}\right),$$

which can be written in vector form:

$$s^{k+1} = \max\left(0, u^{k+1} - \frac{\gamma_5^k}{\mu_5}\right).$$

Similarly, embodiments of the invention can solve for $v^{k+1}$ by introducing a non-negative slack variable t and computing $$(\rho_3 DD^T + \mu_4 gg^T + \rho_6 I)v^{k+1} = r_v, \quad (26)$$

where $$r_v = \rho_3 Dw^{k+1} - \mu_4 gb^{k+1} - g\gamma_4^k - \mu_4 g(1 - p^k) + \gamma_6 + \mu_6 t^k.$$

Embodiments of the invention can solve for the $t^{k+1}$ corresponding to $v^{k+1}$ similar to the solution for s:

$$t^{k+1} = \max\left(0, v^{k+1} - \frac{\gamma_6^k}{\mu_6}\right).$$

Now, given $(w^{k+1}, b^{k+1}, u^{k+1}, v^{k+1})$, the solutions for a and c are the same as in Lines 4 and 5 of Algorithm 2:

$$a^{k+1} = S_{\frac{1}{N\mu_1}}\left(e + \frac{\gamma_1^k}{\mu_1} - Y(Xw^{k+1} + b^{k+1}e)\right), \quad (27)$$

$$c^{k+1} = \mathcal{T}_{\frac{\lambda_1}{\mu_2}}\left(\frac{\gamma_2^k}{\mu_2} + w^{k+1}\right).$$

The subsystem with respect to q is $$\min_q \rho_2(q)_+ - \gamma_3^k q + \frac{\mu_3}{2}\|d^T u^k - b^{k+1} + 1 - q\|_2^2 \equiv \quad (28)$$

$$\rho_2(q)_+ + \frac{\mu_3}{2}\left\|q - \left(d^T u^k - b^{k+1} + 1 + \frac{\gamma_3^k}{\mu_3}\right)\right\|_2^2.$$

The solution is given by a (one-dimensional) proximal operator associated with the hinge loss:

$$q^{k+1} = S_{\frac{\rho_2}{\mu_3}}\left(d^T u^k - b^{k+1} + 1 + \frac{\gamma_3^k}{\mu_3}\right). \quad (29)$$

Similarly, the subsystem with respect to p is:

$$\min_p \rho_4(p)_+ - \gamma_4^k p + \frac{\mu_4}{2}\|g^T v^k + b^{k+1} - 1 - p\|_2^2, \quad (30)$$

and the solution is given by $$p^{k+1} = S_{\frac{\rho_4}{\mu_4}}\left(g^T v^k + b^{k+1} + 1 + \frac{\gamma_4^k}{\mu_4}\right). \quad (31)$$

Figure 4B:
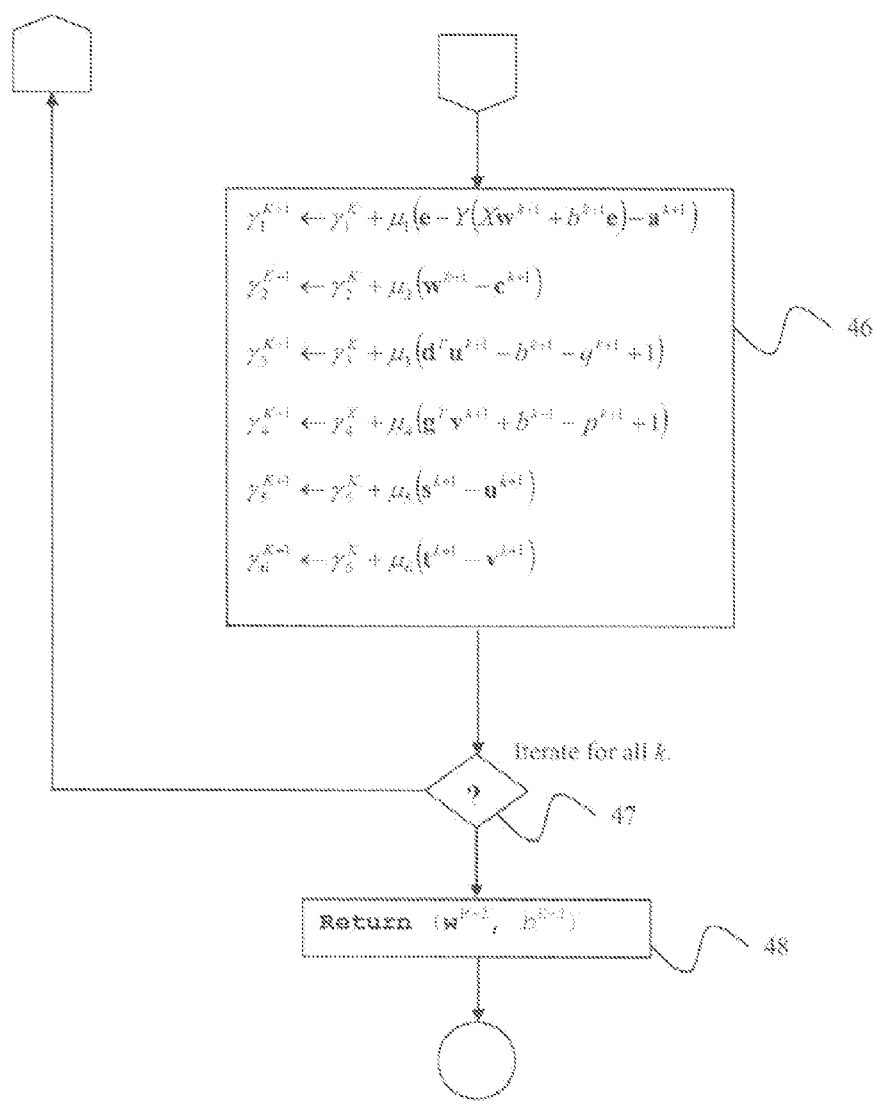

The above steps are summarized in Algorithm 4, with reference to the steps of the flowchart in FIGS. 4A-B.

| Algorithm 4: ADMM-ENK |
| --- |
| 1. Input: $w^0, b^0, a^0, c^0, u^0, v^0, p^0, q^0, s^0 \geq 0, t^0 \geq 0$, and the parameters $\gamma_i^0, \lambda_1, \lambda_2, \rho_i, i = 1, \ldots, 6$. (Step 40) |
| 2. for $k = 0, 1, \ldots, K - 1$ do |
| 3. $(w^{k+1}, b^{k+1}) \leftarrow$ PCG solution of EQ. (21) (Step 41) |
| 4. $u^{k+1} \leftarrow$ solution of EQ. (25) (Step 42) |
| 5. $s^{k+1} \leftarrow \max\left(0, u^{k+1} - \frac{\gamma_5^k}{\mu_5}\right)$ (Step 42) |
| 6. $v^{k+1} \leftarrow$ solution of EQ. (26) (Step 43) |
| 7. $t^{k+1} \leftarrow \max\left(0, v^{k+1} - \frac{\gamma_6^k}{\mu_6}\right)$ (Step 43) |
| 8. $a^{k+1} \leftarrow S_{1/N\mu_1}\left(e + \frac{\gamma_1^k}{\mu_1} - Y(Xw^{k+1} + b^{k+1}e)\right)$ (Step 44) |
| 9. $c^{k+1} \leftarrow T_{\lambda_1/\mu_2}\left(\frac{\lambda_2^k}{\mu_2} + w^{k+1}\right)$ (Step 45) |
| 10. $q^{k+1} \leftarrow S_{\rho_2/\mu_3}\left(d^T u^k - b^{k+1} + 1 + \frac{\gamma_3^k}{\mu_3}\right)$ (Step 45) |
| 11. $p^{k+1} \leftarrow S_{\rho_4/\mu_4}\left(g^T v^k + b^{k+1} + 1 + \frac{\gamma_4^k}{\mu_4}\right)$ (Step 45) |
| 12. $\gamma_1^{K+1} \leftarrow \gamma_1^K + \mu_1(e - Y(Xw^{k+1} + b^{k+1}e) - a^{k+1})$ (Step 46) |
| 13. $\gamma_2^{K+1} \leftarrow \gamma_2^K + \mu_2(w^{k+1} - c^{k+1})$ (Step 46) |
| 14. $\gamma_3^{K+1} \leftarrow \gamma_3^K + \mu_3(d^T u^{k+1} - b^{k+1} - q^{k+1} + 1)$ (Step 46) |
| 15. $\gamma_4^{K+1} \leftarrow \gamma_4^K + \mu_4(g^T v^{k+1} + b^{k+1} - p^{k+1} + 1)$ (Step 46) |
| 16. $\gamma_5^{K+1} \leftarrow \gamma_5^K + \mu_5(s^{k+1} - u^{k+1})$ (Step 46) |
| 17. $\gamma_6^{K+1} \leftarrow \gamma_6^K + \mu_6(t^{k+1} - v^{k+1})$ (Step 46) |
| 18. end for (Step 47) |
| 19. return $(w^{K-1}, b^{K-1})$ (Step 48) |

Although there appears to be ten additional parameters (two $\lambda$'s, four $\rho$'s and four $\mu$'s) in the ADMM method for ENK-SVM, embodiments of the invention can set the $\rho$'s to the same value and do the same for the $\mu$'s. Hence, in practice, there is only one additional parameter to tune, and experiments described below indicate that an algorithm according to an embodiment of the invention is insensitive to the $\mu$'s. In addition, note that due to the presence of additional constraints, the stopping criteria of EQ. (7) should not be used to break out of the loop over k.

3.2 IPM Phase

The Hessian of EQ. (17) (KSVM-P) with respect to the variables $\beta = (w, b, \xi, u, v, \eta_u, \eta_v) \in R^M$, $M = m + N + k_1 + k_2 + 3$, is a highly sparse matrix:

$$H = \begin{pmatrix} (1 + \rho_1 + \rho_3)I_m & 0 & \rho_1 B^T & -\rho_3 D^T & 0 \\ & 0 & & & \\ \rho_1 B & 0 & \rho_1 BB^T & & 0 \\ -\rho_3 D & 0 & & \rho_3 DD^T & 0 \\ & & 0 & & \end{pmatrix}. \quad (32)$$

An exemplary, non-limiting solver for solving EQ. (17) is the IPM QP solver available from www.mosek.com. The Mosek solver contains a highly efficient primal-dual IPM implementation that works very well for large sparse systems. To use the solver's interface from a HIPAD algorithm according to an embodiment of the invention, EQ. (17) is cast into the general form:

$$\min_\beta \frac{1}{2} \beta^T H \beta + f^T \beta \quad (33)$$

$$a_l \leq A\beta \leq a_u,$$

$$x_l \leq \beta \leq x_u,$$

with H defined above, $f = (0, 0, ce^T, 0, 0, \rho_2, \rho_4)$, and $$A = \begin{pmatrix} \bar{X} & y & I_n & 0 & 0 & 0 & 0 \\ 0 & -1 & 0 & d^T & 0 & -1 & 0 \\ 0 & 1 & 0 & 0 & g^T & 0 & -1 \end{pmatrix}, \quad (34)$$

$$a_l = \begin{pmatrix} e \\ 0 \\ 0 \end{pmatrix}, a_u = \begin{pmatrix} 0 \\ -1 \\ -1 \end{pmatrix}.$$

The box-constraint limit values $x_l$ and $x_u$ depend upon the component of $\beta$. For the first component, w, the values of $x_l$ and $x_u$ are $\pm\infty$, since the w are unconstrained. For the other components, $x_l = 0$ and $x_u = \infty$.

A two-phase algorithm for an elastic-net KSVM that incorporates domain knowledge according to an embodiment of the invention is presented in Algorithm 5, with reference to the steps of the flowchart in FIG. 5.

| Algorithm 5: HIPAD-ENK |
| --- |
| 1 Input: $w^0, b^0, a^0, c^0, u^0, v^0, p^0, q^0, s^0 \geq 0, t^0 \geq 0$, (Step 51) |
| 2 // PHASE 1: ADMM for ENK-SVM |
| 3 $(w, b, u, v) \leftarrow$ (Step 52) ADMM-ENK $(w^0, b^0, a^0, c^0, u^0, v^0, p^0, q^0, s^0, t^0)$ |
| 4 // PHASE 2: IPM for KSVM |
| 5 $\tilde{w} \leftarrow$ non-zero components of w (Step 53) |
| 6 $(\tilde{X}, \tilde{Y}) \leftarrow$ sub-matrices of $(X, Y)$ corresponding to the support of w (Step 54) |
| 7 $\eta_u^0 \leftarrow d^T u - b + 1$ (Step 55) |
| 8 $\eta_v^0 \leftarrow g^T v + b + 1$ (Step 55) |
| 9 $(w, b) \leftarrow$ (Step 56) SVM-IPM $(\tilde{X}, \tilde{Y}, \tilde{w}, b, u, v, \eta_u^0, \eta_v^0)$ using EQS. (32) and (34) |
| 10 return $(w, b)$ (Step 57) |

3.3 Convergence

Recall from Remark 1 that the convergence of ADMM, as stated in Theorem 1, only applies to the case of two-way update of the variables. In a first phase of Algorithm 5, while the updates to a, c, q, p, s and t are independent from each other given (w, b, u, v), the updates to w, b, u, and v are not. However, one may observe from EQS. (21), (25), and (26) that the new iterate of (w, b, u, v) can be computed by solving an augmented linear system in (w, b, u, v) similar to Line 3 in Algorithm 4. With this modification, Algorithm 4 essentially employs a two-way update of the variables (w, b, u, v) and (a, c, p, q). Hence, convergence is guaranteed by Theorem 1. In practice, a sequential updating scheme for (w, b, u, v) is maintained.

4. Experiments

An exemplary, non-limiting HIPAD algorithm according to an embodiment of the invention can be written in C/C++, and use the CBLAS interface and the BLAS implementation provided by the GNU Scientific Library for basic linear algebra routines, and where code for the ADMM phase is based on that from G. Ye, Y. Chen, and X. Xie, "Efficient variable selection in support vector machines via the alternating direction method of multipliers", AISTAT 2010, 2010, the contents of which are herein incorporated by reference in their entirety. Algorithm according to embodiments of the invention were tested on both synthetic and real data and compared with the LIBSVM disclosed in R. Fan, P. Chen, and C. Lin, "Working set selection using second order information for training support vector machines", *The Journal of Machine Learning Research*, 6:1889-1918, 2005, the contents of which are herein incorporated by reference in their entirety, and ADMM-ENSVM. Since LIBSVM does not support ENSVM, it was used to train a standard SVM. An exemplary, non-limiting HIPAD-ENK according to an embodiment of the invention was written in Matlab, and the Mosek QP IPM solver was used for an IPM for KSVM phase according to an embodiment of the invention through the solver's Matlab interface.

The transition condition at the end of a first phase of a HIPAD according to an embodiment of the invention is specified in EQ. (7), with $\epsilon_{tol}=10^{-2}$. The stopping criteria for ADMM-ENSVM are as follows:

$$\frac{|F^{k+1} - F^k|}{\max\{1, |F^k|\}} \leq \epsilon_1,$$

$$\|a - (e - \overline{X}w - yb)\|_2 \leq \epsilon_1,$$

$$\|c - w\|_2 \leq \epsilon_1,$$

$$\frac{\|w^{k+1} - w\|_2}{\|w^k\|_2} \leq \epsilon_2,$$

where $F^k$ is the objective value at the k-th iteration, $\epsilon_1=10^{-5}$, and $\epsilon_2=10^{-3}$.

4.1 Synthetic Data

Synthetic data sets were generated from real data sets as follows. For each real data set, the feature space was augmented to a dimensionality of M=10,000 (or 20,000). The original m features occupy the first m entries in the feature vector. The remaining features were generated as independent and identically distributed (i.i.d.) Gaussian. Table 1, shown in FIG. 7, summarizes the attributes of the synthetic data sets. In the table, $N_1$=the training set size, and $N_2$=the test set size. The numbers in parentheses are in the augmented feature dimensions. The prediction accuracy of the algorithms did not appear sensitive to $\lambda_2$ and c. For simplicity, embodiments set $\lambda_2=1.0$ and c=10 for a HIPAD according to an embodiment of the invention and performed cross validation (CV) to select the best values of $\lambda_1$ for HIPAD and ADMM-ENSVM. For LIBSVM, c=1. Table 2, shown in FIG. 8, presents a comparison of prediction accuracies of HIPAD, ADMM, and LIBSVM on the synthetic data, with LIBSVM as the baseline for prediction performance. The entries (x/y) in the columns Support Size indicates that x out of y features are the original features. The last column shows the prediction accuracies obtained by LIBSVM on the original real data sets.

This set of data simulates the presence of noisy features. The prediction accuracy of LIBSVM, which is a standard SVM, falls because of the interference of the noise. In contrast, the results show that a HIPAD according to an embodiment of the invention is robust to noisy features in that it can select the most important true features and eliminate the noisy features, producing the same, or even better, prediction accuracies as those on the original data, as shown in the last column in Table 2. A HIPAD according to an embodiment of the invention is also faster than ADMM-ENSVM on these dense data sets.

4.2. Real Data

A HIPAD algorithm according to an embodiment of the invention was tested on nine real data sets which are publicly available. Table 3, shown in FIG. 9, presents the real data sets, where $N_1$=the training set size, and $N_2$=the test set size. rcv1 is a collection of manually categorized news wires from Reuters. The original multiple labels have been consolidated into two classes for binary classification. real-sim contains UseNet articles from four discussion groups for simulated auto racing, simulated aviation, real autos, and real aviation. Both rcv1 and real-sim have large feature dimensions but are highly sparse. The rest of the seven data sets are all dense data. rcv1 and real-sim are subsets of the original data sets, from which 500 training instances and 1,000 test instances were randomly sampled. gisette is a handwriting digit recognition system from NIPS 2003 Feature Selection Challenge, from which 500 instances were sub-sampled for training. For testing, the original test set of 1,000 instances was used. duke, leukemia, and colon-cancer are data sets of gene expression profiles for breast cancer, leukemia, and colon cancer respectively. fMRIa, fMRIb, and fMRIc are functional MRI (fMRI) data of brain activities when the subjects are presented with pictures and text paragraphs. This data was compiled and made available by Tom Mitchell's neuroinformatics research group at Carnegie Mellon University's School of Computer Science, http://www.cs.cmu.edu/~tom/. Except for the three fMRI data sets, all the other data sets and their references are available at the LIBSVM website, www.csie.ntu.edu.tw/cj-lin/libsvmtools/datasets.

The parameters of HIPAD, ADMM-ENSVM, and LIBSVM were selected through cross validation on the training data. The experiment results are summarized in Table 4, shown in FIG. 10 where the best prediction accuracy for each data set is highlighted in bold. The results show that a HIPAD algorithm according to an embodiment of the invention produced the best overall predication performance. In terms of speed, a HIPAD algorithm according to an embodiment of the invention consistently outperformed ADMM-ENSVM on dense data, which is consistent with the synthetic data results. On the sparse data sets, however, ADMM-ENSVM required less training time than a HIPAD algorithm according to an embodiment of the invention. Note that the OOQP solver in embodiments of a HIPAD is a general QP solver and takes less advantage of the data sparsity and formulation structure than would a customized IPM solver for SVM. The feature support sizes selected by a HIPAD algorithm according to an embodiment of the invention were also competitive or even better than the those selected by ADMM-ENSVM. In most cases, a HIPAD algorithm according to an embodiment of the invention was able to shrink the feature space to below 10% of the original size.

4.3. Simulation for Knowledge Incorporation

Synthetic data was generated to simulate the example presented at the beginning of Domain Knowledge Incorporation section in a high dimensional feature space. Specifically, four groups of multivariate Gaussians $K_1, \ldots, K_4$ were sampled from $N(\mu_1^+, \Sigma_1), \ldots, N(\mu_4^+, \Sigma_4), N(\mu_1^-, \Sigma_1), \ldots, N(\mu_4^-, \Sigma_4)$ $N(\mu, \Sigma)$ for four disjoint blocks of feature values ($x_{K_1}, \ldots, x_{K_4}$). For positive class samples, $\mu_1^+=2$, $\mu_2^+=0.5$, $\mu_3^+=-0.2$, $\mu_4^+=-1$; for negative class samples, $\mu_1^-=-2$, $\mu_2^-=-0.5$, $\mu_3^-=0.2$, $\mu_4^-=1$. All the covariance matrices have 1 on the diagonal and 0.8 everywhere else. The training samples contain blocks $K_2$ and $K_3$, while all four blocks are present in the test samples. A random fraction (5%-10%) of the remaining entries in all the samples are generated from a standard Gaussian distribution.

It was challenging to separate the training samples because the values of blocks $K_2$ and $K_3$ for the two classes are close to each other. However, blocks $K_1$ and $K_4$ in the test samples are well-separated. Hence, if one is given information about these two blocks as general knowledge for an entire population, the resulting SVM classifier would perform much better on the test data. Since the mean values of the distributions from which the entries in $K_1$ and $K_4$ are generated are known, the following information about the relationship between the block sample means and class membership can be supplied to the KSVM:

$$\frac{1}{L_1}\sum_{i\in K_1} x_i \geq 4 \Rightarrow x \text{ belongs to the positive class,}$$

$$\frac{1}{L_4}\sum_{i\in K_4} x_i \geq 3 \Rightarrow x \text{ belongs to the negative class,}$$

where $L_j$ is the length of the $K_j$, $j=1,\ldots,4$, and the lowercase $x_i$ denotes the i-th entry of the sample x. Translating into the notation of (KSVM-P):

$$B = \begin{pmatrix} 0 & -\frac{e^T}{L_1} & 0 & 0 & 0 & 0 \\ & K_1 & & & & \end{pmatrix}, d = -4,$$

$$D = \begin{pmatrix} 0 & 0 & 0 & 0 & -\frac{e^T}{L_4} & 0 \\ & & & & K_4 & \end{pmatrix}, g = -3.$$

The information given here is not precise, in that a sample should belong to the positive (or negative) class only when the corresponding block sample mean well exceeds the distribution mean. This is consistent with real-world situations, where the domain or expert knowledge tends to be conservative and often does not come in exact form.

Figure 12:
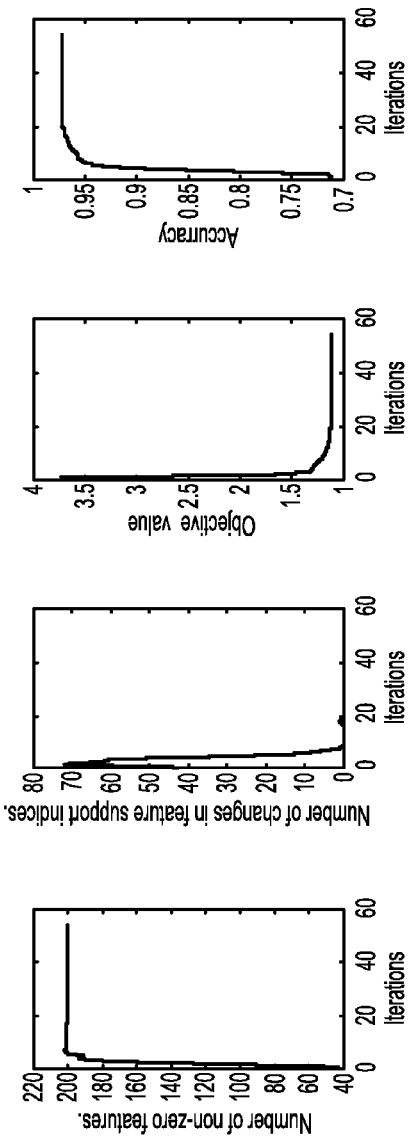
FIG. 12 depicts plots of various attributes of an ADMM-ENK according to an embodiment of the invention against iterations.
Figure 13:
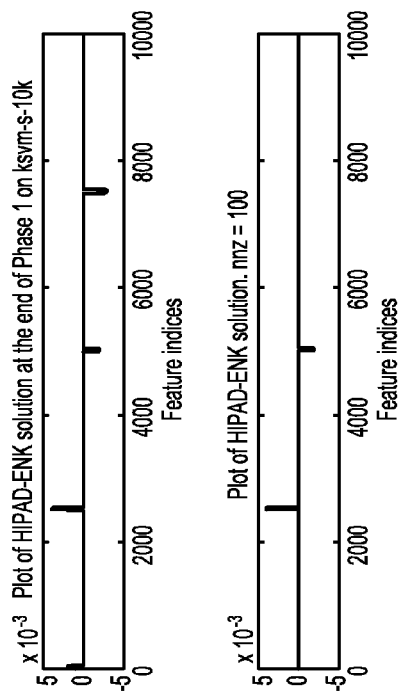
FIG. 13 (top) is a plot of the solution w returned by a first phase of a HIPAD-ENK according to an embodiment of the invention on the data set ksvm-s-10k.

Two sets of synthetic data were simulated for ENK-SVM as described above, with ($N_{train}$=200, $N_{test}$=400, $m_{train}$=10; 000) for a dataset ksvm-s-10k and ($N_{train}$=500, $N_{test}$=1,000, $m_{test}$=50; 000) for a dataset ksvm-s-50k. The number of features in each of the four blocks ($K_1$, $K_2$, $K_3$, $K_4$) is 50 for both data sets. The parameters of a HIPAD-ENK (Algorithm 5) according to an embodiment of the invention are set as follows: $\lambda_1$=0:1, $\lambda_2$=1.$\rho_1$=$\rho_3$=50; $\rho_2$=$\rho_4$=25 in an ADMM phase according to an embodiment of the invention; c=0.05, $\rho_1$=$\rho_3$=5,000, $\rho_2$=$\rho_4$=2,500 in an IPM phase according to an embodiment of the invention. For LIBSVM, c=1.0. Experimental results are presented in Table 5, shown in FIG. 11, and FIG. 12. In Table 5, the best prediction accuracy for each data set is highlighted in bold. FIG. 12 depicts plots of various attributes of an ADMM-ENK according to an embodiment of the invention against iterations. The attributes are, from left to right, the number of non-zero features, the number of changes in feature support indices, the objective value, and accuracy. The data set is ksvm-s-10k. A first phase of HIPAD-ENK terminated at iteration 20, when all four blocks of features had been correctly identified and the improvement in accuracy of ADMM-ENK leveled off. A HIPAD-ENK according to an embodiment of the invention is effective in terms of speed, feature selection, and prediction accuracy on these two data sets. FIG. 13 (top) is a plot of the solution w returned by a first phase of a HIPAD-ENK according to an embodiment of the invention on the data set ksvm-s-10k. The non-zero features correspond to blocks $K_1$ to $K_4$ in that order. FIG. 13 (bottom) is a plot of the solution w returned by a HIPAD-ENK according to an embodiment of the invention on the data set ksvm-s-10k when d=g=0. The non-zero features correspond to blocks $K_2$ and $K_3$. Even though the features in blocks $K_1$ and $K_4$ do not discriminate in the training data, a HIPAD-ENK according to an embodiment of the invention was still able to identify all 200 features in the four blocks correctly and exactly, as illustrated in FIG. 13. The expert knowledge not only helps rectify the separating hyperplane so that it generalizes better on the entire population, but also helps the training algorithm realize the significance of the features in blocks $K_1$ and $K_4$.

In fact, the feature supports identified by a HIPAD-ENK according to an embodiment of the invention also provides an indication on how useful (or valid) the given information is towards the current classification task. To demonstrate that, d and g above were both changed to 0. This time, a HIPAD-ENK according to an embodiment of the invention did not include $K_1$ and $K_4$ in the feature support as shown in FIG. 13. The reason is quite intuitive: the features in $K_1$ and $K_4$ of the training data are sparse zero-mean Gaussian noise and have little correlation with the class labels, resulting in a significant number of training samples whose class membership contradicts the supplied knowledge. This shows that an ENK-SVM according to an embodiment of the invention is robust to false information that contradicts the training data.

5. System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 14:
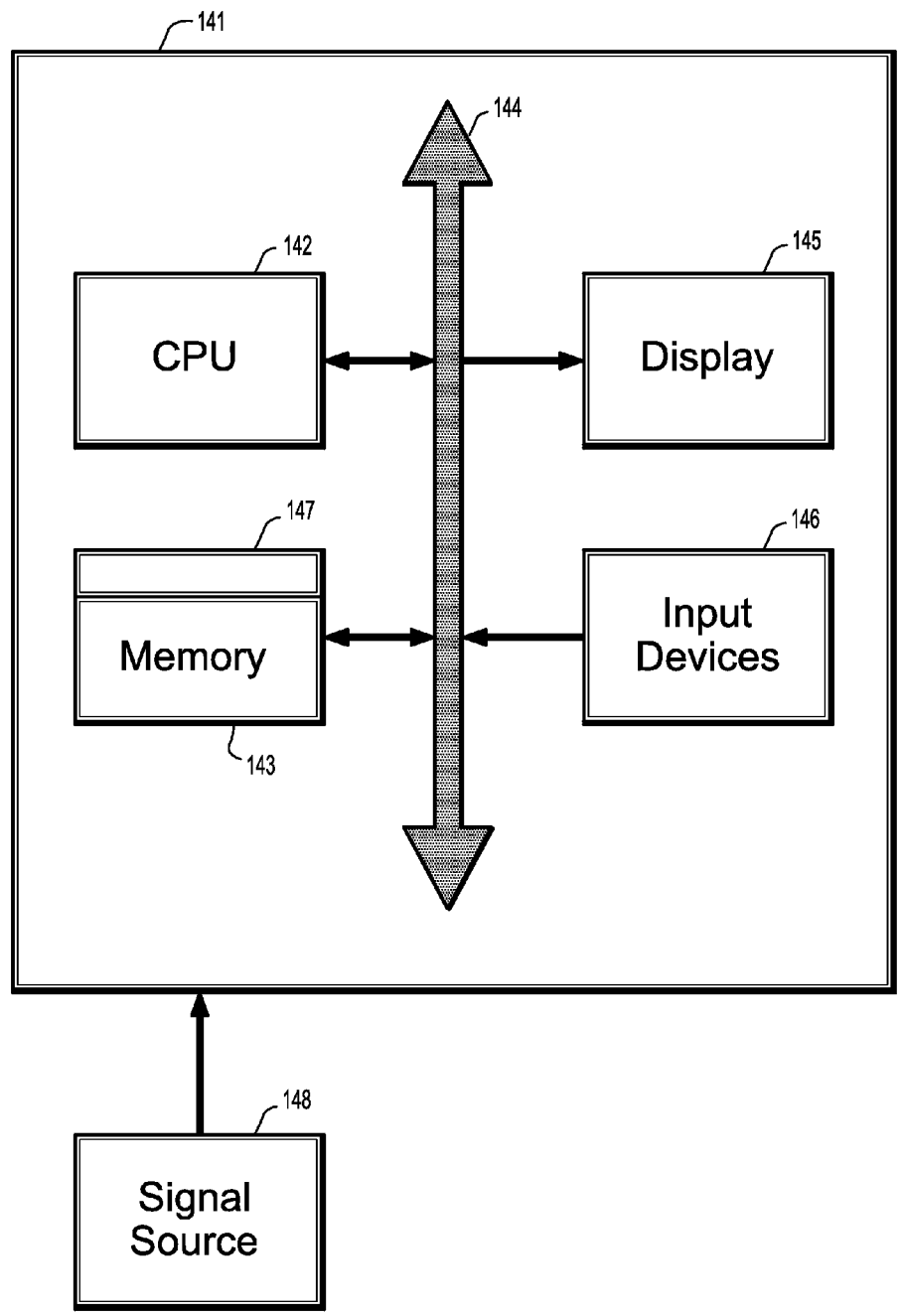
FIG. 14 is a block diagram of an exemplary computer system for implementing a hybrid interior-point alternating directions algorithm for support vector machines and feature selection, according to an embodiment of the invention.

FIG. 14 is a block diagram of an exemplary computer system for implementing a hybrid interior-point alternating directions algorithm for support vector machines and feature selection according to an embodiment of the invention. Referring now to FIG. 14, a computer system 141 for implementing the present invention can comprise, inter alia, a central processing unit (CPU) 142, a memory 143 and an input/output (I/O) interface 144. The computer system 141 is generally coupled through the I/O interface 144 to a display 145 and various input devices 146 such as a mouse and a keyboard. The support circuits can include circuits such as cache, power supplies, clock circuits, and a communication bus. The memory 143 can include random access memory (RAM), read only memory (ROM), disk drive, tape drive, etc., or a combinations thereof. The present invention can be implemented as a routine 147 that is stored in memory 143 and executed by the CPU 142 to process the signal from the signal source 148. As such, the computer system 141 is a general purpose computer system that becomes a specific purpose computer system when executing the routine 147 of the present invention.

The computer system 141 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-implemented method for training a classifier for selecting features in sparse data sets with high feature dimensionality, the method performed by the computer comprising the steps of:

providing a set of N data items x and associated labels y, each data item being a vector in $R^m$ where $m \gg 1$;

minimizing a functional of the data items x and associated labels y $$L(w, b, a, c, \gamma_1, \gamma_2) := \frac{1}{N}\sum_{i=1}^{N} a_i + \lambda_1\|c\|_1 + \frac{\lambda_2}{2}\|w\|_2^2 + \gamma_1^T(e - Y(Xw + be) - a) + \gamma_2^T(w - c) + \frac{\mu_1}{2}\|e - Y(Xw + be) - a\|_2^2 + \frac{\mu_2}{2}\|w - c\|_2^2$$

formed from a program $$\min_{w,b,a,c} \frac{1}{N}\sum_{i=1}^{N} a_i + \lambda_1\|c\|_1 + \frac{\lambda_2}{2}\|w\|_2^2$$

subject to $$\begin{cases} a = e - Y(Xw + be), \\ c = w. \end{cases}$$

to solve for hyperplane w and offset b of a classifier using an alternating direction method of multipliers that successively iteratively approximates w and b, auxiliary variables a and c, and multiplier vectors $\gamma_1$ and $\gamma_2$, wherein $\lambda_1$, $\lambda_2$, $\mu_1$, and $\mu_2$ are predetermined constants, e is a unit vector, and X and Y are respective matrix representations of the data items x and their associated labels y;

providing non-zero elements of the hyperplane vector w and those components of X and Y that correspond to the non-zero elements of the hyperplane vector w as arguments to a convex quadratic program solver that uses an interior point method to solve for hyperplane vector w and offset b, wherein the hyperplane vector w and offset b define a classifier than can associate each data item x with the correct label y.

2. The method of claim 1, wherein said alternating direction method of multipliers comprises, at each iteration k:

updating ($w^k$, $b^k$) by solving $$\begin{pmatrix} (\lambda_2 + \mu_2)I + \mu_1 X^T X & \mu_1 X^T e \\ \mu_1 e^T X & \mu_1 N \end{pmatrix} \begin{pmatrix} w^{k+1} \\ b^{k+1} \end{pmatrix} = \begin{pmatrix} X^T Y \gamma_1^k - \mu_1 X^T Y(a^k - e) - \gamma_2^k + \mu_2 c^k \\ e^T Y \gamma_1^k - \mu_1 e^T Y(a_k - e) \end{pmatrix},$$

updating a from $$a^{k+1} \leftarrow S_{1/N\mu_1}\left(e + \frac{\gamma_1^k}{\mu_1} - Y(Xw^{k+1} + b^{k+1}e)\right),$$

wherein $$S_\lambda(\omega) = \begin{cases} \omega - \lambda, & \omega > \lambda, \\ 0, & 0 \leq \omega \leq \lambda, \\ \omega, & \omega < 0; \end{cases}$$

updating c from $$c^{k+1} \leftarrow T_{\lambda_1/\mu_2}\left(\frac{\gamma_2^k}{\mu_2} + w^{k+1}\right)$$

wherein $T_\lambda(\omega) = \mathrm{sgn}(\omega)\max\{0, |\omega| - \lambda\}$;

updating $\gamma_1$ from $\gamma_1^{k+1} \leftarrow \gamma_1^k + \rho_1(e - Y(Xw^{k+1} + b^{k+1}e) - a^{k+1})$; and updating $\gamma 2$ from $\gamma_2^{k+1} \leftarrow \gamma_2^k + \mu_2(w^{k+1} - c^{k+1})$;

wherein said updates are repeated until $$\frac{\|w^{k+1} - w^k\|}{\max(\|w^k\|, 1)} < \varepsilon_{tol},$$

wherein $\epsilon_{tol}$ is a predetermined constant.

3. The method of claim 2, wherein the linear system $$\begin{pmatrix} (\lambda_2 + \mu_2)I + \mu_1 X^T X & \mu_1 X^T e \\ \mu_1 e^T X & \mu_1 N \end{pmatrix} \begin{pmatrix} w^{k+1} \\ b^{k+1} \end{pmatrix} = \begin{pmatrix} X^T Y \gamma_1^k - \mu_1 X^T Y(a^k - e) - \gamma_2^k + \mu_2 c^k \\ e^T Y \gamma_1^k - \mu_1 e^T Y(a_k - e) \end{pmatrix}$$

is solved using a preconditioned conjugate gradient method.

4. The method of claim 1, wherein said convex quadratic program solver minimizes a quadratic program $\frac{1}{2}w^T w + ce^T \xi$ with respect to w, b, s, and $\xi$ subject to $$\begin{cases} y_i(w^T x_i - b) - s_i + \xi_i = 1, & i = 1, \ldots, N, \\ s \geq 0, \xi \geq 0, \end{cases}$$

wherein c is a predetermined penalty parameter for $\xi$, and $y_i$ and $x_i$ are components of $\overline{X}$, $\overline{Y}$ corresponding to non-zero elements of w.

5. The method of claim 1, wherein said convex quadratic program solver minimizes a quadratic program $\tfrac{1}{2}\alpha^T Q\alpha - e^T\alpha$ that is a dual of $\tfrac{1}{2}w^T w + ce^T\xi$, wherein $\tfrac{1}{2}\alpha^T Q\alpha - e^T\alpha$ is minimized with respect to $\alpha$ subject to $$\begin{cases} y^T\alpha = 0, \\ 0 \le \alpha_i \le c, \quad i=1,\ldots,N, \end{cases}$$

and c is a predetermined penalty parameter for $\xi$.

6. A computer-implemented method for training a classifier for selecting features in sparse data sets with high feature dimensionality that incorporates prior domain knowledge, the method performed by the computer comprising the steps of:
   providing a set of data items x and associated labels y, each data item being a vector in $R^m$ where $m \gg 1$, a set of positive class constraints $Bx \le d \Rightarrow w^T x + b \ge 1$, wherein $B \in R^{k_1 \times m}$ and $d \in R^{k_1}$, and a set of negative class constraints $Dx \le g \Rightarrow w^T x + b \le -1$, wherein $D \in R^{k_2 \times m}$ and $g \in R^{k_2}$;
   using Farkas lemma to transform the positive class constraints into $B^T u + w = 0$, $d^T u - b + 1 \le 0$, $u \ge 0$ and negative class constraints into $D^T v - w = 0$, $g^T v + b + 1 \le 0$, $v \ge 0$;
   minimizing a functional $$L = \frac{\lambda_2}{2}\|w\|_2^2 + \lambda_1\|c\|_1 + \frac{1}{N}eT(a)_+ + \frac{\rho_1}{2}\|B^T u + w\|_2^2 +$$
$$\rho_2(q)_+ + \frac{\rho_3}{2}\|D^T v - w\|_2^2 + \rho_4(p)_+ + \gamma_1^T(e - (\overline{X}w + yb) - a) +$$
$$\frac{\mu_1}{2}\|e - (\overline{X} + yb) - a\|_2^2 + \gamma_2^T(w-c) + \frac{\mu_2}{2}\|w-c\|_2^2 +$$
$$\gamma_3(d^T u - b + 1 - q) + \frac{\mu_3}{2}\|d^T u - b + 1 - q\|_2^2 +$$
$$\gamma_4(g^T v + b + 1 - p) + \frac{\mu_4}{2}\|g^T v + b + 1 - p\|_2^2$$

to solve for hyperplane w and offset b of a classifier using an alternating direction method of multipliers that successively iteratively approximates w and b, constraint variables u and v, auxiliary variables a, c, p and q, and Lagrangian multipliers $\gamma_1^{k+1}$, $\gamma_2^{k+1}$, $\gamma_3^{k+1}$, $\gamma_4^{k+1}$, $\gamma_5^{k+1}$, and $\gamma_6^{k+1}$ wherein $\lambda_1$, $\lambda_2$, $\rho_1$, $\rho_2$, $\rho_3$, $\rho_4$, $\mu_1$, $\mu_2$, $\mu_3$, and $\mu_4$ are predetermined constants, e is a unit vector, and X and Y are respective matrix representations of the data items x and their associated labels y; and
   providing non-zero elements of the hyperplane vector w, those components of X and Y that correspond to the non-zero elements of the hyperplane vector w, and $\eta_u^0 \equiv d^T u - b + 1$, $\eta_v^0 \equiv g^T v + b + 1$ as arguments to a convex quadratic program solver that uses an interior point method to solve for hyperplane vector w and offset b, wherein the hyperplane vector w and offset b define a classifier than can associate each data item x with the correct label y.

7. The method of claim 6, wherein updating $(w^k, b^k)$ comprises solving $$\begin{pmatrix} \kappa_1 I + \mu_1 X^T X & \mu_1 X^T e \\ \mu_1 e^T X & \mu_1 N + \kappa_2 \end{pmatrix} \begin{pmatrix} w^{k+1} \\ b^{k+1} \end{pmatrix} = \begin{pmatrix} r_w \\ r_b \end{pmatrix}$$

wherein $\kappa_1 = \lambda_2 + \mu_2 + \rho_1 + \rho_3,$ $\kappa_2 = \mu_3 + \mu_4,$ $r_w = X^T Y \gamma_1^k + \mu_1 X^T Y(e - a^k) - \gamma_2^k + \mu_2 c^k + \rho_3 D^T v^k - \rho_1 B^T u^k,$ and $r_b = e^T Y \gamma_1^k + \mu_1 e^T Y(e - a^k) + \gamma_3^k + \mu_3(d^T u^k + 1 - q^k) - \gamma_4^k - \mu_4 (g^T v^k + 1 - p^k).$ 8. The method of claim 7, wherein $$\begin{pmatrix} \kappa_1 I + \mu_1 X^T X & \mu_1 X^T e \\ \mu_1 e^T X & \mu_1 N + \kappa_2 \end{pmatrix} \begin{pmatrix} w^{k+1} \\ b^{k+1} \end{pmatrix} = \begin{pmatrix} r_w \\ r_b \end{pmatrix}$$

is solved using a preconditioned conjugate gradient method.

9. The method of claim 6, wherein updating constraint variables u and v comprises solving $(\rho_1 BB^T + \mu_3 dd^T + \mu_5 I) u^{k+1/2} = r_u,$ wherein $r_u = -\rho_1 B w^{k+1} + \mu_3 db^{k+1} + \mu_3 d(q^k - 1) - d\gamma_3^k + \gamma_5 + \mu_5 s^k,$ and $(\rho_3 DD^T + \mu_4 gg^T + \mu_6 I) v^{k+1} = r_v,$ wherein $r_v = \rho_3 D w^{k+1} - \mu_4 g b^{k+1} - g\gamma_4^k - \mu_4 g(1 - p^k) + \gamma_6 + \mu_6 t^k,$
wherein slack variables s and t are updated according to $$s^{k+1} = \max\left(0, u^{k+1} - \frac{\gamma_5^k}{\mu_5}\right) \text{ and } t^{k+1} = \max\left(0, v^{k+1} - \frac{\gamma_6^k}{\mu_6}\right).$$

10. The method of claim 6, wherein the auxiliary variables a, c, p and q are updated according to $$a^{k+1} = s_{\frac{1}{N\mu_1}}\left(e + \frac{\gamma_1^k}{\mu_1} - Y(Xw^{k+1} + b^{k+1}e)\right),$$

$$c^{k+1} = T_{\frac{\lambda_1}{\mu_2}}\left(\frac{\gamma_2^k}{\mu_2} + w^{k+1}\right),$$

$$q^{k+1} = S_{\frac{\rho_2}{\mu_3}}\left(d^T u^k - b^{k+1} + 1 + \frac{\gamma_3^k}{\mu_3}\right),$$

$$p^{k+1} = S_{\frac{\rho_4}{\mu_4}}\left(g^T v^k - b^{k+1} + 1 + \frac{\gamma_4^k}{\mu_4}\right),$$

wherein $$S_\lambda(\omega) = \begin{cases} \omega - \lambda, & \omega > \lambda, \\ 0, & 0 \le \omega \le \lambda, \\ \omega, & \omega < 0; \end{cases}$$

and $T_\lambda(\omega) = \text{sgn}(\omega)\max\{0, |\omega| - \lambda\}$.

11. The method of claim 6, wherein the Lagrangian multipliers $\gamma_1^{k+1}$, $\gamma_2^{k+1}$, $\gamma_3^{k+1}$, $\gamma_4^{k+1}$, $\gamma_5^{k+1}$, and $\gamma_6^{k+1}$ are updated according to $\gamma_1^{K+1} \leftarrow \gamma_1^K + \mu_1(e - Y(Xw^{K+1} + b^{K+1}e) - a^{k+1}),$ $\gamma_2^{K+1} \leftarrow \gamma_2^K + \mu_2(w^{k+1} - c^{k+1}),$ $\gamma_3^{K+1} \leftarrow \gamma_3^K + \mu_3(d^T u^{k+1} - b^{k+1} - q^{k+1} + 1),$ $\gamma_4^{K+1} \leftarrow \gamma_4^K + \mu_4(g^T v^{k+1} + b^{k+1} - p^{k+1} + 1),$ $\gamma_5^{K+1} \leftarrow \gamma_5^{K} \mu_5(s^{k+1}-u^{k+1})$, and $\gamma_6^{K+1} \leftarrow \gamma_6^{K} \mu_6(t^{k+1}-v^{k+1})$.

12. The method of claim 6, wherein said convex quadratic program solver minimizes a quadratic program $\frac{1}{2}\beta^T H\beta+f^T\beta$ with respect to $\beta$ subject to $$\begin{cases} a_l \leq A\beta \leq a_u, \\ x_l \leq \beta \leq x_u, \end{cases}$$

wherein $\beta=(w, b, \xi, u, v, \eta_u, \eta_v) \in R^M$, $M=m+n+k_1+k_2+3$, $f=(0,0,ce^T,0,0,\rho_2,\rho_4)$, $$H = \begin{pmatrix} (1+\rho_1+\rho_3)I_m & 0 & \rho_1 B^T & -\rho_3 D^T & 0 \\ & 0 & & & \\ \rho_1 B & 0 & \rho_1 BB^T & & 0 \\ -\rho_3 D & 0 & & \rho_3 DD^T & 0 \\ & 0 & & & \end{pmatrix}$$

$$A = \begin{pmatrix} \overline{X} & y & I_n & 0 & 0 & 0 & 0 \\ 0 & -1 & 0 & d^T & 0 & -1 & 0 \\ 0 & 1 & 0 & 0 & g^T & 0 & -1 \end{pmatrix},$$

$$a_l = \begin{pmatrix} e \\ 0 \\ 0 \end{pmatrix}, a_u = \begin{pmatrix} 0 \\ -1 \\ -1 \end{pmatrix},$$

and the values of $x_l$, $x_u = \pm\infty$, respectively, for w, and $x_l=0$, $x_u=\infty$ for the other components of $\beta$.

13. A non-transitory program storage device readable by a computer, tangibly embodying a program of instructions executed by the computer to perform the method steps for training a classifier for selecting features in sparse data sets with high feature dimensionality that incorporates prior domain knowledge, the method comprising the steps of:

providing a set of data items x and associated labels y, each data item being a vector in $R^m$ where m>>1, a set of positive class constraints $Bx \leq d \Rightarrow w^T x+b \geq 1$, wherein $B \in R^{k_1 \times m}$ and $d \in R^{k_1}$, and a set of negative class constraints $Dx \leq g \Rightarrow w^T x+b \leq -1$, wherein $D \in R^{k_2 \times m}$ and $g \in R^{k_2}$;

using Farkas lemma to transform the positive class constraints into $B^T u+w=0$, $d^T u-b+1 \leq 0$, $u \geq 0$ and negative class constraints into $D^T v-w=0$, $g^T v+b+1 \leq 0$, $v \geq 0$;

minimizing a functional $$L = \frac{\lambda_2}{2}\|w\|_2^2 + \lambda_1\|c\|_1 + \frac{1}{N}eT(a)_+ + \frac{\rho_1}{2}\|B^T u+w\|_2^2 +$$

$$\rho_2(q)_+ + \frac{\rho_3}{2}\|D^T v-w\|_2^2 + \rho_4(p)_+ + \gamma_1^T(e-(\overline{X}_w+yb)-a)+$$

$$\frac{\mu_1}{2}\|e-(\overline{X}+yb)-a\|_2^2 + \gamma_2^T(w-c) + \frac{\mu_2}{2}\|w-c\|_2^2 +$$

$$\gamma_3(d^T u-b+1-q) + \frac{\mu_3}{2}\|d^T u-b+1-q\|_2^2 +$$

$$\gamma_4(g^T v+b+1-p) + \frac{\mu_4}{2}\|g^T v+b+1-p\|_2^2$$

to solve for hyperplane w and offset b of a classifier using an alternating direction method of multipliers that successively iteratively approximates w and b, constraint variables u and v, auxiliary variables a, c, p and q, and Lagrangian multipliers $\gamma_1^{k+1}$, $\gamma_2^{k+1}$, $\gamma_3^{k+1}$, $\gamma_4^{k+1}$, $\gamma_5^{k+1}$, and $\gamma_6^{k+1}$ wherein $\lambda_1$, $\lambda_2$, $\rho_1$, $\rho_2$, $\rho_3$, $\rho_4$, $\mu_1$, $\mu_2$, $\mu_3$, and $\mu_4$ are predetermined constants, e is a unit vector, and X and Y are respective matrix representations of the data items x and their associated labels y; and providing non-zero elements of the hyperplane vector w, those components of X and Y that correspond to the non-zero elements of the hyperplane vector w, and $\eta_u^0 \equiv d^T u-b+1, \eta_v^0 \equiv g^T v+b+1$ as arguments to a convex quadratic program solver that uses an interior point method to solve for hyperplane vector w and offset b, wherein the hyperplane vector w and offset b define a classifier than can associate each data item x with the correct label y.

14. The computer readable program storage device of claim 13, wherein updating $(w^k, b^k)$ comprises solving $$\begin{pmatrix} \kappa_1 I + \mu_1 X^T X & \mu_1 X^T e \\ \mu_1 e^T X & \mu_1 N + \kappa_2 \end{pmatrix} \begin{pmatrix} w^{k+1} \\ b^{k+1} \end{pmatrix} = \begin{pmatrix} r_w \\ r_b \end{pmatrix}$$

wherein $\kappa_1 = \lambda_2+\mu_2+\rho_1+\rho_3$, $\kappa_2 = \mu_3+\mu_4$, $r_w = X^T Y\gamma_1^k + \mu_1 X^T Y(e-a^k) - \gamma_2^k + \mu_2 c^k + \rho_3 D^T v^k - \rho_1 B^T u^k$, and $r_b = e^T Y\gamma_1^k + \mu_1 e^T Y(e-a^k) + \gamma_3^k + \mu_3(d^T u^k+1-q^k) - \gamma_4^k - \mu_4(g^T v^k+1-p^k)$.

15. The computer readable program storage device of claim 14, wherein $$\begin{pmatrix} \kappa_1 I + \mu_1 X^T X & \mu_1 X^T e \\ \mu_1 e^T X & \mu_1 N + \kappa_2 \end{pmatrix} \begin{pmatrix} w^{k+1} \\ b^{k+1} \end{pmatrix} = \begin{pmatrix} r_w \\ r_b \end{pmatrix}$$

is solved using a preconditioned conjugate gradient method.

16. The computer readable program storage device of claim 13, wherein updating constraint variables u and v comprises solving $(\rho_1 BB^T+\mu_3 dd^T+\mu_5 I)u^{k+1/2}=r_u$, wherein $r_u = -\rho_1 Bw^{k+1} + \mu_3 db^{k+1} + \mu_3 d(q^k-1) - d\gamma_3^k + \gamma_5^k + \mu_5 s^k$, and $(\rho_3 DD^T+\mu_4 gg^T+\mu_6 I)v^{k+1}=r_v$, wherein $r_v = \rho_3 Dw^{k+1} - \mu_4 gb^{k+1} - \mu_4 g(1-p^k) + \gamma_6^k + \mu_6 t^k$, wherein slack variables s and t are updated according to $$s^{k+1} = \max\left(0, u^{k+1}-\frac{\gamma_5^k}{\mu_5}\right) \text{ and } t^{k+1} = \max\left(0, v^{k+1}-\frac{\gamma_6^k}{\mu_6}\right).$$

17. The computer readable program storage device of claim 13, wherein the auxiliary variables a, c, p and q are updated according to $$a^{k+1} = s_{\frac{1}{N\mu_1}}\left(e + \frac{\gamma_1^k}{\mu_1} - Y(Xw^{k+1} + b^{k+1}e)\right),$$

$$c^{k+1} = T_{\frac{\lambda_1}{\mu_2}}\left(\frac{\gamma_2^k}{\mu_2} + w^{k+1}\right),$$

$$q^{k+1} = S_{\frac{\rho_2}{\mu_3}}\left(d^T u^k - b^{k+1} + 1 + \frac{\gamma_3^k}{\mu_3}\right),$$

$$p^{k+1} = S_{\frac{\rho_4}{\mu_4}}\left(g^T v^k - b^{k+1} + 1 + \frac{\gamma_4^k}{\mu_4}\right),$$

wherein $$S_\lambda(\omega) = \begin{cases} \omega - \lambda, & \omega > \lambda, \\ 0, & 0 \leq \omega \leq \lambda, \\ \omega, & \omega < 0; \end{cases}$$

and $T_\lambda(\omega) = \text{sgn}(\omega)\max\{0, |\omega| - \lambda\}$.

18. The computer readable program storage device of claim 13, wherein the Lagrangian multipliers $\gamma_1^{k+1}$, $\gamma_2^{k+1}$, $\gamma_3^{k+1}$, $\gamma_4^{k+1}$, $\gamma_5^{k+1}$, and $\gamma_6^{k+1}$ are updated according to $\gamma_1^{K+1} \leftarrow \gamma_1^K + \mu_1(e - Y(Xw^{k+1} + b^{k+1}e) - a^{k+1})$, $\gamma_2^{K+1} \leftarrow \gamma_2^K + \mu_2(w^{k+1} - c^{k+1})$, $\gamma_3^{K+1} \leftarrow \gamma_3^K + \mu_3(d^T u^{k+1} - b^{k+1} - q^{k+1} + 1)$, $\gamma_4^{K+1} \leftarrow \gamma_4^K + \mu_4(g^T v^{k+1} + b^{k+1} - p^{k+1} + 1)$, $\gamma_5^{K+1} \leftarrow \gamma_5^K + \mu_5(s^{k+1} - u^{k+1})$, $\gamma_6^{K+1} \leftarrow \gamma_6^K + \mu_6(t^{k+1} - v^{k+1})$.

19. The computer readable program storage device of claim 13, wherein said convex quadratic program solver minimizes a quadratic program $\frac{1}{2}\beta^T H\beta + f^T\beta$ with respect to $\beta$ subject to $$\begin{cases} a_l \leq A\beta \leq a_u, \\ x_l \leq \beta \leq x_u, \end{cases}$$

wherein $\beta = (w, b, \xi, u, v, \eta_u, \eta_v) \in R^M$, $M = m+n+k_1+k_2+3$, $f = (0, 0, ce^T, 0, 0, \rho_2, \rho_4)$, $$H = \begin{pmatrix} (1+\rho_1+\rho_3)I_m & 0 & \rho_1 B^T & -\rho_3 D^T & 0 \\ & 0 & & & \\ \rho_1 B & 0 & \rho_1 BB^T & & 0 \\ -\rho_3 D & 0 & & \rho_3 DD^T & 0 \\ & 0 & & & \end{pmatrix}$$

$$A = \begin{pmatrix} \overline{X} & y & I_n & 0 & 0 & 0 & 0 \\ 0 & -1 & 0 & d^T & 0 & -1 & 0 \\ 0 & 1 & 0 & 0 & g^T & 0 & -1 \end{pmatrix},$$

$$a_l = \begin{pmatrix} e \\ 0 \\ 0 \end{pmatrix}, a_u = \begin{pmatrix} 0 \\ -1 \\ -1 \end{pmatrix},$$

and the values of $x_l$, $x_u = \pm\infty$, respectively, for w, and $x_l = 0$, $x_u = \infty$ for the other components of $\beta$.

* * * * *